(12) United States Patent
Soneda et al.

(10) Patent No.: US 10,498,716 B2
(45) Date of Patent: Dec. 3, 2019

(54) MANAGEMENT SYSTEM, COMMUNICATION CONTROL METHOD, AND COMMUNICATION SYSTEM

(71) Applicants: Takuya Soneda, Kanagawa (JP); Naoki Umehara, Kanagawa (JP); Hiroshi Hinohara, Kanagawa (JP); Atsushi Miyamoto, Kanagawa (JP); Takeshi Horiuchi, Tokyo (JP)

(72) Inventors: Takuya Soneda, Kanagawa (JP); Naoki Umehara, Kanagawa (JP); Hiroshi Hinohara, Kanagawa (JP); Atsushi Miyamoto, Kanagawa (JP); Takeshi Horiuchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 307 days.

(21) Appl. No.: 15/341,349

(22) Filed: Nov. 2, 2016

(65) Prior Publication Data
US 2017/0149755 A1    May 25, 2017

(30) Foreign Application Priority Data

Nov. 25, 2015 (JP) ................. 2015-229813
Nov. 25, 2015 (JP) ................. 2015-229814

(51) Int. Cl.
*H04L 29/06* (2006.01)
*H04L 29/08* (2006.01)
*H04W 12/08* (2009.01)

(52) U.S. Cl.
CPC .............. *H04L 63/08* (2013.01); *H04L 63/10* (2013.01); *H04L 67/16* (2013.01); *H04L 67/303* (2013.01); *H04W 12/08* (2013.01)

(58) Field of Classification Search
CPC ......... H04L 63/08; H04L 63/10; H04L 67/16; H04L 67/303; H04L 67/08; H04L 67/38;
(Continued)

(56) References Cited

U.S. PATENT DOCUMENTS 7,734,723 B2 *  6/2010  Bedi ..................... G06Q 10/10
                                                            709/218
9,064,011 B2 *  6/2015  Maharajh ............... G06Q 10/10
(Continued)

FOREIGN PATENT DOCUMENTS

JP          2007-287148          11/2007

*Primary Examiner* — Todd L Barker
(74) *Attorney, Agent, or Firm* — Oblon, McClelland, Maier & Neustadt, L.L.P.

(57) ABSTRACT

A management system, a method of controlling communication, and a communication system. The management system and method includes receiving a request to distribute information related to a prescribed attribute from a first communication terminal that is authenticated by a first client, receiving a request to receive a message related to the prescribed attribute from a second communication terminal that is authenticated by a second client, and controlling distribution of the information related to the prescribed attribute to the second communication terminal based on whether a first service that is used by the first client and a second service that is used by the second client are each associated with the prescribed attribute. The communication system includes a first communication terminal executing a first application, a second communication terminal executing a second application, and a management system to communicate with the first communication terminal and the second communication terminal.

9 Claims, 20 Drawing Sheets

(58) Field of Classification Search
CPC ..... H04L 65/1003; H04L 65/40; H04L 63/16;
H04L 63/303; G06Q 30/0205; H04W
4/02; H04W 4/029; H04W 4/21; H04W
8/18; H04W 12/08; G06F 17/00; G06F
12/0813; G06F 13/4221; G06F 16/176;
G06F 16/28; G06F 3/0655; G06F 3/067;
G06F 3/0607; G06F 3/0689; G06F 9/05
See application file for complete search history.

(56) References Cited

U.S. PATENT DOCUMENTS

| | | |
|---|---|---|
| 2005/0273499 A1 | 12/2005 | Goodman et al. |
| 2007/0055669 A1* | 3/2007 | Murillo ................ G06Q 10/109 |
| 2010/0088408 A1 | 4/2010 | Asai et al. |
| 2010/0250867 A1* | 9/2010 | Bettger .................. G06F 3/067 |
| | | 711/152 |
| 2013/0132058 A1* | 5/2013 | Butler .................... H04L 67/38 |
| | | 703/21 |
| 2013/0166703 A1 | 6/2013 | Hammer et al. |
| 2013/0295963 A1* | 11/2013 | Sen ........................ H04W 4/21 |
| | | 455/456.3 |
| 2016/0080334 A1* | 3/2016 | Hamilton ............... H04L 67/26 |
| | | 713/168 |

* cited by examiner

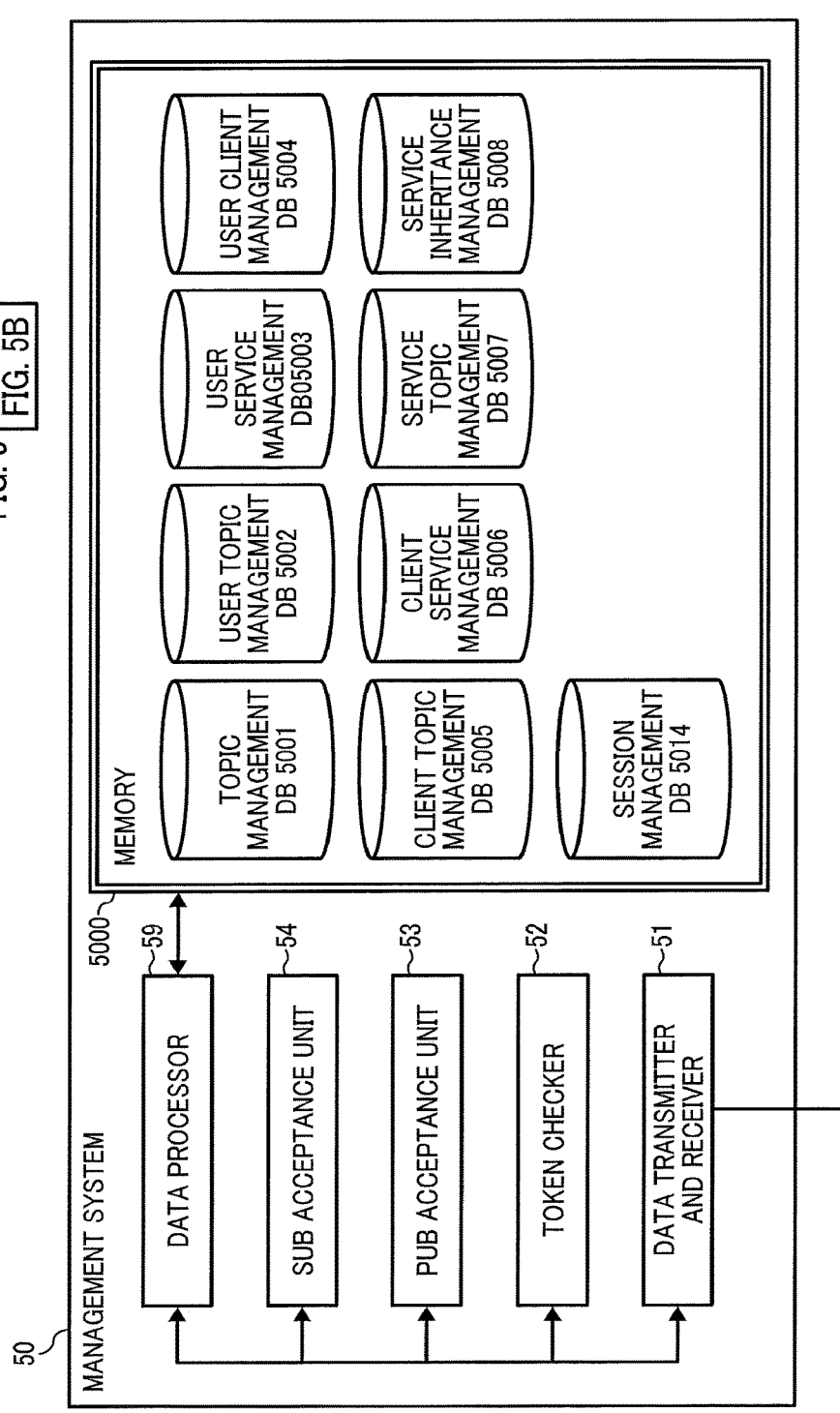

FIG. 6A

| USER ID | USER NAME | PASSWORD |
|---------|-----------|----------|
| U01 | User1 | abc |
| U02 | User2 | def |
| U03 | User3 | ghi |

FIG. 6B

| CLIENT ID | CLIENT NAME | PASSWORD |
|-----------|-------------|----------|
| C01 | CAMERA APPLICATION | aaaa |
| C02 | VIDEOCONFERENCE APPLICATION FOR PERSONAL COMMUNICATION TERMINAL | bbbb |
| C03 | VIDEOCONFERENCE APPLICATION FOR OS1 | cccc |
| C04 | VIDEOCONFERENCE APPLICATION FOR OS2 | dddd |
| C05 | COOPERATION APPLICATION FOR OS2 | eeee |
| C06 | COOPERATION APPLICATION FOR OS1 | ffff |

FIG. 6C

| SERVICE ID | SERVICE NAME |
|------------|--------------|
| S01 | MEDIA CONTROL SERVICE |
| S02 | VIDEOCONFERENCE SERVICE |
| S03 | VIDEO CONFERENCE COOPERATIVE SERVICE |

FIG. 6D

| SERVICE ID | CLIENT ID |
|------------|-----------|
| S01 | C02 |
| S01 | C03 |
| S02 | C02 |
| S02 | C03 |
| S02 | C04 |
| S03 | C05 |
| S03 | C06 |

FIG. 7A

| TOPIC ID | TOPIC NAME |
|---|---|
| T01 | camera |
| T02 | bandwidth |
| T03 | signaling |
| T04 | video |
| T05 | QR |

FIG. 7B

| USER ID | TOPIC ID | AUTHORIZATION INFORMATION |
|---|---|---|
| U01 | T02 | pub |
| U01 | T03 | pubsub |
| U01 | T04 | sub |
| U02 | T01 | sub |
| U02 | T02 | sub |
| U02 | T03 | sub |
| U02 | T04 | pubsub |
| U03 | T03 | sub |
| U03 | T04 | sub |
| U03 | T05 | sub |

FIG. 7C

| USER ID | SERVICE ID | AUTHORIZATION INFORMATION |
|---|---|---|
| U01 | S01 | pub |
| U01 | S02 | sub |
| U02 | S01 | pubsub |
| U02 | S02 | pub |
| U02 | S03 | pubsub |
| U03 | S03 | pubsub |

FIG. 7D

| USER ID | CLIENT ID | AUTHORIZATION INFORMATION |
|---|---|---|
| U01 | C02 | sub |
| U01 | C03 | sub |
| U02 | C01 | pubsub |
| U02 | C04 | pub |
| U02 | C05 | pub |
| U03 | C06 | sub |

FIG. 7E

| TOPIC ID | CLIENT ID | AUTHORIZATION INFORMATION |
|---|---|---|
| T01 | C01 | pub |
| T02 | C02 | sub |
| T02 | C03 | pubsub |
| T03 | C02 | pubsub |
| T03 | C03 | sub |
| T03 | C02 | pubsub |
| T03 | C05 | pub |
| T03 | C06 | pubsub |
| T04 | C02 | sub |
| T04 | C03 | pubsub |
| T04 | C04 | sub |
| T04 | C05 | pubsub |
| T04 | C06 | pub |
| T05 | C05 | pubsub |
| T05 | C06 | pubsub |

FIG. 7F

| SERVICE ID | CLIENT ID |
|---|---|
| S01 | C02 |
| S01 | C03 |
| S02 | C02 |
| S02 | C03 |
| S02 | C04 |
| S03 | C05 |
| S03 | C06 |

FIG. 7G

| TOPIC ID | SERVICE ID | AUTHORIZATION INFORMATION |
|---|---|---|
| T02 | S01 | pubsub |
| T03 | S02 | pubsub |
| T04 | S02 | pubsub |
| T05 | S03 | pubsub |

FIG. 7H

| SERVICE ID OF SERVICES TO BE INHERITED | SERVICE ID OF SERVICES THAT INHERIT SERVICES TO BE INHERITED |
|---|---|
| S02 | S03 |

FIG. 7I

| USER ID | CLIENT ID | SERVICE ID | TOPIC ID |
|---|---|---|---|
| U01 | C02 | S02 | T04 |

FIG. 13A

| TOPIC ID | TOPIC NAME |
|---|---|
| T01 | camera |
| T02 | bandwidth |
| T03 | signaling |
| T04 | video |
| T05 | QR |

FIG. 13B

| USER ID | TOPIC ID | AUTHORIZATION INFORMATION |
|---|---|---|
| U01 | T01, T05 | pubsub |
| U01 | T02 | sub |
| U01 | T04 | pub |
| U02 | T01 | pub |
| U02 | T02 | sub |
| U02 | T03 | pub |
| U03 | T01, T02 | pubsub |
| U03 | T03 | pub |
| U03 | T04 | pub |
| U03 | T05 | pub |

FIG. 13C

| USER ID | SERVICE ID | AUTHORIZATION INFORMATION |
|---|---|---|
| U01 | S01 | sub |
| U01 | S02 | pub |
| U01 | S03 | pubsub |
| U02 | S01 | pubsub |
| U02 | S02 | sub |
| U03 | S01, S02 | pubsub |

FIG. 13D

| USER ID | CLIENT ID | AUTHORIZATION INFORMATION |
|---|---|---|
| U01 | C01, C04, C05, C06 | pubsub |
| U01 | C02 | pub |
| U01 | C03 | pub |
| U02 | C02, C03, C06 | pubsub |
| U02 | C04 | sub |
| U02 | C05 | sub |
| U03 | C01, C02, C03, C04, C05 | pubsub |
| U03 | C06 | pub |

FIG. 13E

| TOPIC ID | CLIENT ID | AUTHORIZATION INFORMATION |
|---|---|---|
| T01 | C01 | pub |
| T01 | C02, C03, C04, C05, C06 | pubsub |
| T02 | C02 | sub |
| T02 | C01, C04, C05, C06 | pubsub |
| T03 | C01 | pubsub |
| T03 | C03 | sub |
| T03 | C05 | pub |
| T04 | C02 | pub |
| T04 | C04 | sub |
| T04 | C06 | pub |
| T04 | C01 | pubsub |
| T05 | C01, C02, C03, C04 | pubsub |

FIG. 13F

| SERVICE ID | CLIENT ID |
|---|---|
| S01 | C02 |
| S01 | C03 |
| S02 | C02 |
| S02 | C03 |
| S02 | C04 |
| S03 | C05 |
| S03 | C06 |

FIG. 13G

| TOPIC ID | SERVICE ID | AUTHORIZATION INFORMATION |
|---|---|---|
| T01 | S01, S02, S03 | pubsub |
| T02 | S02, S03 | pubsub |
| T03 | S01, S03 | pubsub |
| T04 | S01, S03 | pubsub |
| T05 | S01, S02 | pubsub |

FIG. 13H

| SERVICE ID OF SERVICES TO BE INHERITED | SERVICE ID OF SERVICES TO BE INHERITED |
|---|---|
| S02 | S03 |

FIG. 13I

| USER ID | CLIENT ID | SERVICE ID | TOPIC ID |
|---|---|---|---|
| U01 | C02 | S02 | T04 |

MANAGEMENT SYSTEM, COMMUNICATION CONTROL METHOD, AND COMMUNICATION SYSTEM

CROSS-REFERENCE TO RELATED APPLICATIONS

This patent application is based on and claims priority pursuant to 35 U.S.C. § 119(a) to Japanese Patent Application Nos. 2015-229813 and 2015-229814, filed on Nov. 25, 2015, and Nov. 25, 2015, respectively, in the Japan Patent Office, the entire disclosures of which are hereby incorporated by reference herein.

BACKGROUND

Technical Field

Embodiments of the present invention relate to a management system, a communication control method, and a communication system.

Background Art

In recent years, communication systems for performing phone conversation or video conference through the communication network such as the Internet or private lines are widely used due to increasing demands for reduction in cost and time. When communication among a plurality of communication terminals is started, such communication systems exchange contents of data such as image data and audio data with each other. Accordingly, the communication among the participants who use the communication terminals is realized. Moreover, as a method of sending contents of data from one communication terminal to some other communication terminals, the publish-subscribe model is known in the art (hereinafter, the publish-subscribe model may be referred to simply as "pub/sub model").

For example, a method for providing access control in the content-based publish/subscribe system is known in the art (see JP-2007-287148-A). In this method, messages are delivered from publishing clients to subscribing clients via a plurality of routing brokers. In this method, the routing brokers select a starting point where a new access control rule is established. The messages prior to the selected starting point are sent to the subscribing clients only when these messages satisfy a subscription filter and an access filter before a change that is associated with an access control version identifier. Moreover, the messages after the selected starting point are sent to the subscribing clients when these messages satisfy both the subscription filter and the access filter after the change that is associated with the access control version identifier.

According to the publish/subscribe system in JP-2007-287148-A, the rule of access control that a client performs on a message can be changed before and after a starting point where a new access control rule is established. However, with the known communication systems of the publish-subscribe (pub/sub) model, the access to a message cannot be controlled for every service that a client uses.

SUMMARY

Embodiments of the present invention described herein provide a management system, a method of controlling communication, and a communication system. The management system and method includes receiving a request to distribute information related to a prescribed attribute from a first communication terminal that is authenticated by a first client, receiving a request to receive a message related to the prescribed attribute from a second communication terminal that is authenticated by a second client, and controlling distribution of the information related to the prescribed attribute to the second communication terminal based on whether a first service that is used by the first client and a second service that is used by the second client are each associated with the prescribed attribute. The communication system includes a first communication terminal executing a first application, a second communication terminal executing a second application, and a management system to communicate with the first communication terminal and the second communication terminal through a network using a publish-subscribe pattern. The management system includes a receiver to receive a request for distribution including attribute information indicating a prescribed attribute and data of the prescribed attribute from the first application and to receive a request for reception including the attribute information indicating the prescribed attribute from the second application, and a distribution controller to distribute the data of the prescribed attribute to the second application when a first service that is used by the first application and a second service that is used by the second application are each associated with the attribute information indicating the prescribed attribute.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIG. 5A and FIG. 5B are a functional block diagram of a communication terminal, an authentication server, and a management system, according to an embodiment of the present invention.

FIG. 6A, FIG. 6B, FIG. 6C, and FIG. 6D are diagrams each illustrating a data structure of a management table managed by an authentication server, according to an embodiment of the present invention.

FIG. 7A, FIG. 7B, FIG. 7C, FIG. 7D, FIG. 7E, FIG. 7F, FIG. 7G, FIG. 7H, and FIG. 7I are diagrams each illustrating a data structure of a management table managed by a management system, according to an embodiment of the present invention.

FIG. 13A, FIG. 13B, FIG. 13C, FIG. 13D, FIG. 13E, FIG. 13F, FIG. 13G, FIG. 13H, and FIG. 13I are diagrams each illustrating a data structure of a management table managed by a management system, according to alternative embodiment of the present invention.

Figure 1:
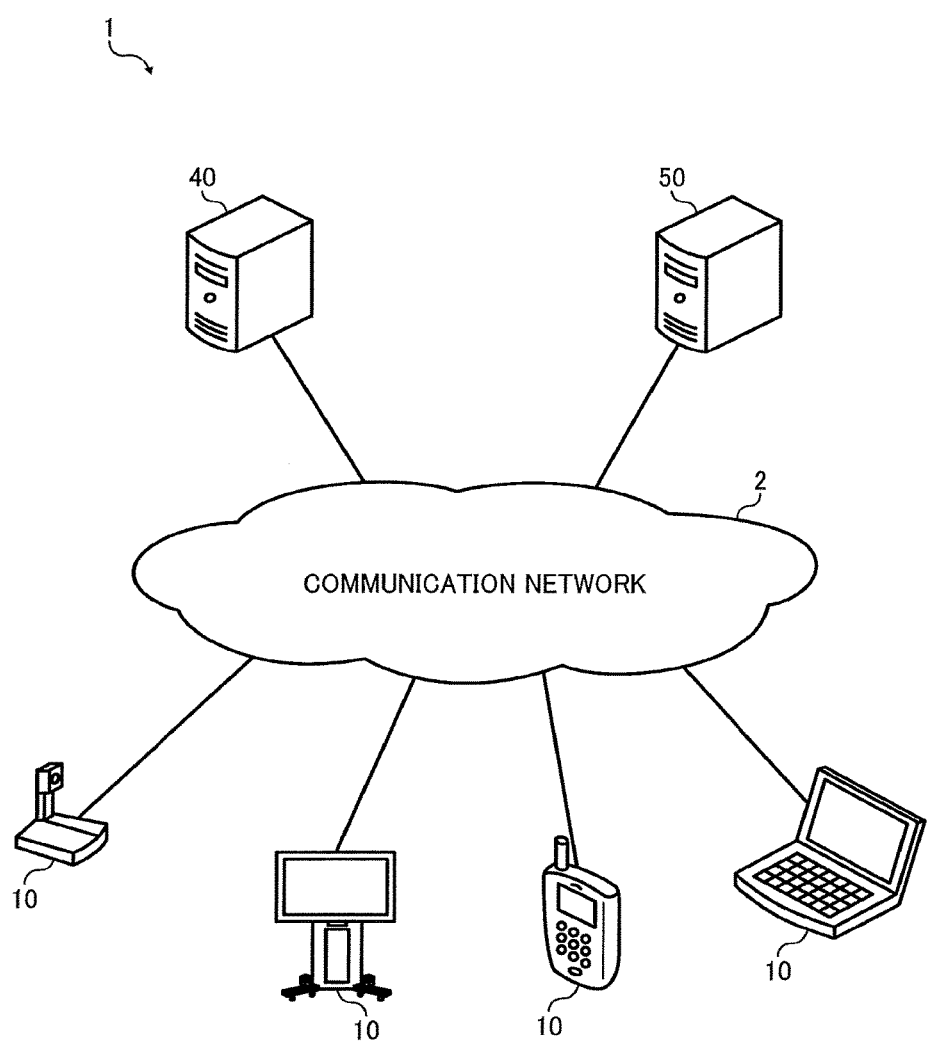
FIG. 1 is a schematic diagram illustrating a configuration of a communication system according to an embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, an embodiment of the present invention is described with reference to the drawings.

<<Schematic Configuration of Communication System>>

FIG. 1 is a schematic diagram illustrating a configuration of a communication system according to the present embodiment.

As illustrated in FIG. 1, the communication system 1 includes a communication terminal 10, an authentication server 40, and a management system 50. Hereinafter, the communication terminal 10 may be referred to simply as the terminal 10.

The management system 50 is a server that receives a message publication request and a message subscription request from clients in the publish-subscribe model. Such message publication requests and message subscription requests are used to exchange messages among clients. The publish-subscribe model may be referred to simply as a pub/sub model, and publication and subscription may be referred to simply as pub and sub, respectively. As a protocol compatible with the pub/sub model, for example, the management system 50 may be provided with a pub/sub extension (XEP-0060) of Message Queue Telemetry Transport (MQTT) or Extensible Messaging and Presence Protocol (XMPP).

The communication terminal 10 may be, for example, a general-purpose communication terminal, and may be installed with a desired client application. Alternatively, the communication terminal 10 may be, for example, a communication terminal that is designed for exclusive use, and may be installed with a specific client application that serves as a client. The communication terminal 10 is connected to the management system 50 through a communication network 2. Accordingly, the clients of the communication terminal 10 can request message pub and message sub from the management system 50. The communication terminal 10 may be, for example, a television conference terminal, an electronic whiteboard, a digital signage, a telephone, a tablet personal computer (PC), a smartphone, a camera, and a PC.

The authentication server 40 is a server that authenticates a client, which is a client application operating on the communication terminal 10, and a user who uses that client, respectively, to authorize the use of the management system 50. In order to implement such authentication and authorization as above, the management system 50 is provided with an authenticating or authorizing protocol such as OAuth 2.0 or OpenID Connect.

For the purpose of simplification, cases in which each of the management system 50 and the authentication server 40 is a single device are described as above with reference to FIG. 1. However, no limitation is intended by such an embodiment. At least one of the management system 50 and the authentication server 40 may include a plurality of devices. Alternatively, the management system 50 and the authentication server 40 may be implemented by a single system or device. Moreover, for the purpose of simplification, cases in which the communication system 1 includes the four communication terminals 10 are described as above with reference to FIG. 1. However, no limitation is intended by such an embodiment. The number of the communication terminals 10 that are provided for the communication system 1 may be two, three, or five or more. The types of the communication terminals 10 may be similar to each other, or may be different from each other as illustrated in FIG. 1.

<<Hardware Configuration>>

Next, the hardware configuration of each element of the communication system 1 is described.

Figure 2:
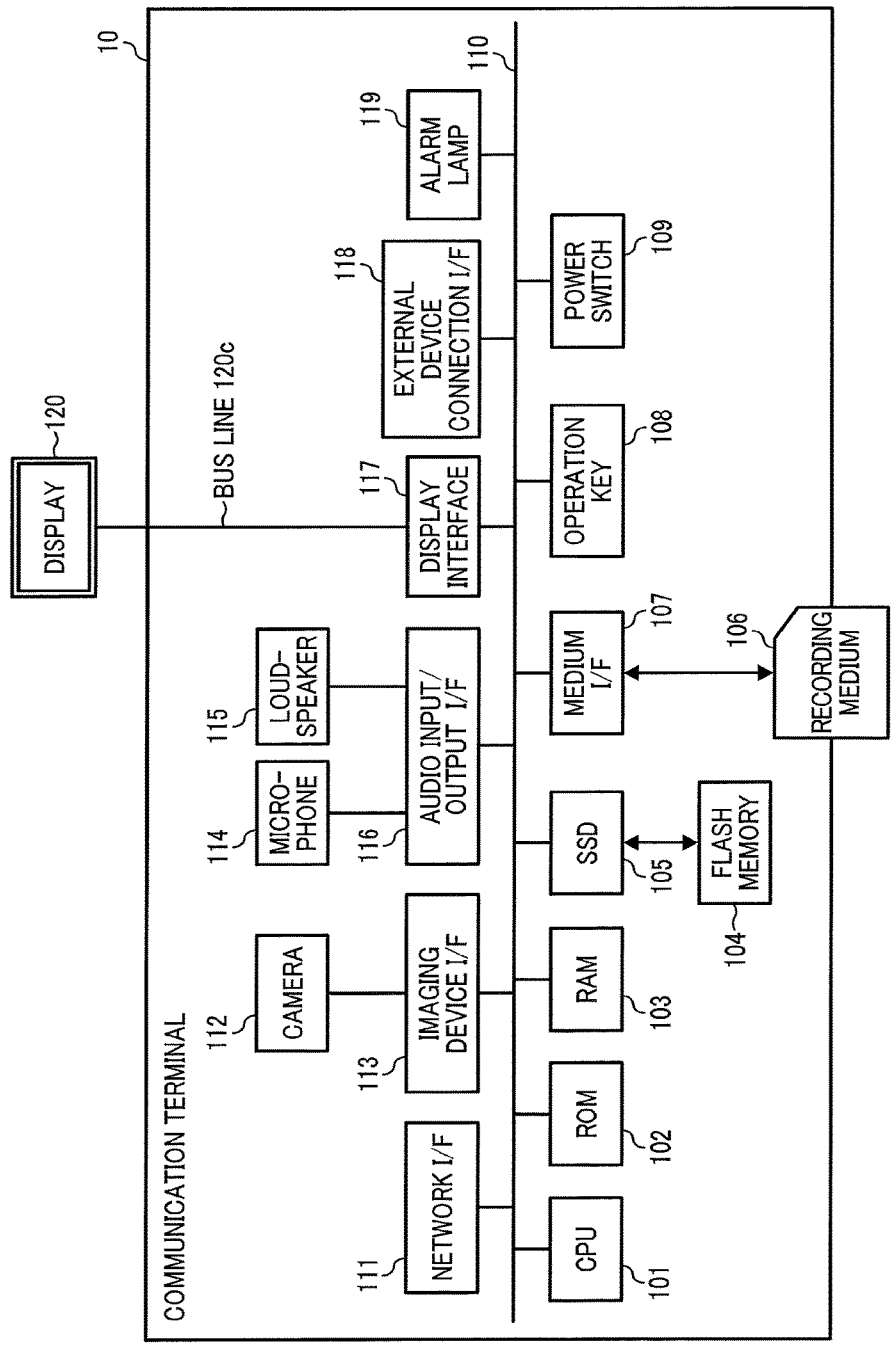
FIG. 2 is a schematic block diagram illustrating a hardware configuration of a communication terminal according to an embodiment of the present invention.

FIG. 2 is a schematic block diagram illustrating the hardware configuration of the communication terminal 10 according to the present embodiment.

The hardware configuration of the communication terminal 10 is not limited to the hardware configuration illustrated in FIG. 2 as long as the communication terminal 10 is capable of performing communication. For example, the communication terminal 10 may include an additional element that is not illustrated in FIG. 2. Alternatively, some of the elements illustrated in FIG. 2 may be omitted. Moreover, some of the elements illustrated in FIG. 2 may be, for example, an external device that can be coupled to the communication terminal 10. As illustrated in FIG. 2, the communication terminal 10 according to the present embodiment includes a central processing unit (CPU) 101 that controls the overall operation of the communication terminal 10, a read-only memory (ROM) 102 that stores a control program used for operating the CPU 101 such as an initial program loader (IPL), a random access memory (RAM) 103 is mainly used as a work area in which the CPU 101 executes a program, a flash memory 104 that stores various kinds of data such as a communication control program for the communication terminal 10, image data, and audio data, a solid state disk (SSD) 105 that controls reading or writing of various kinds of data to or from the flash memory 104 under the control of the CPU 101, a medium interface (I/F) 107 that controls reading or writing of data with respect to a recording medium 106 such as a flash memory and an integrated circuit (IC) card, an operation key 108 that is operated by a user to input a user instruction such as a user selection of a destination of the communication from the communication terminal 10, a power switch 109 that turns on or turns off the power of the communication terminal 10, and a network interface (I/F) 111 that transmits data using the communication network 2.

Moreover, the communication terminal 10 includes a built-in camera 112 that captures a subject under the control of the CPU 101 to obtain the image data of the subject, an imaging device interface (I/F) 113 that controls the operation of the camera 112, a built-in microphone 114 that receives sound, a built-in loudspeaker 115 that outputs sound, an audio input and output (input/output) interface (I/F) 116 that controls the input and output of an audio signal between the microphone 114 and the loudspeaker 115 under the control of the CPU 101, a display interface 117 that transmits the image data to an external display 120 under the control of the CPU 101, an external device connection interface (I/F) 118 that connects the communication terminal 10 to various kinds of external devices, an alarm lamp 119 that provides notification of various kinds of functional abnormalities detected in the communication terminal 10, and a bus line 110 such as an address bus or a data bus that electrically connects various elements as above to each other as illustrated in FIG. 2.

The display 120 may be a liquid crystal or organic electroluminescence (EL) display that displays an image of a subject, an operation icon, or the like. The display 120 is connected to the display interface (I/F) 117 via a cable 120c. The cable 120c may be an analog red green blue (RGB) (video graphic array (VGA)) signal cable, a component video cable, a high-definition multimedia interface (HDMI, registered trademark) signal cable, or a digital video interactive (DVI) signal cable.

The camera 112 includes a lens and a solid-state image sensing device that converts an image (video) of a subject into electronic data by converting light to electric charge. As the solid-state image sensing device, for example, a complementary metal-oxide-semiconductor (CMOS) or a charge-coupled device (CCD) is used.

To the external device connection interface 118, an external device such as an external camera, an external microphone, and an external loudspeaker can be electrically connected, through a Universal Serial Bus (USB) cable or the like that is inserted into a connection port of the housing of the communication terminal 10. In cases where an external camera is connected, the external camera is driven on a priority basis and the built-in camera 112 is not driven under the control of the CPU 101. In a similar manner to the above, in the case where an external microphone is connected or an external loudspeaker is connected, the external microphone or the external loudspeaker is driven under the control of the CPU 101 on a top-priority basis over the built-in microphone 114 or the built-in loudspeaker 115.

The recording medium 106 is removable from the communication terminal 10. In addition, a nonvolatile memory that reads or writes data under control of the CPU 101 is not limited to the flash memory 104, and an electrically erasable and programmable read-only memory (EEPROM) may be used instead.

Figure 3:
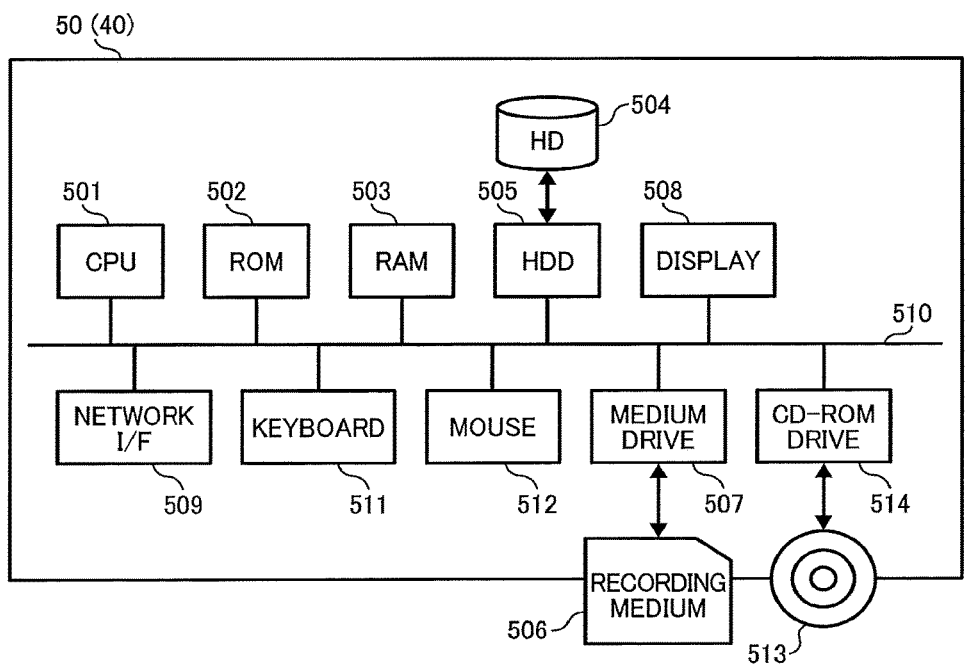
FIG. 3 is a schematic block diagram illustrating a hardware configuration of a management system according to an embodiment of the present invention.

FIG. 3 is a schematic block diagram illustrating a hardware configuration of the management system 50 according to the present embodiment.

The management system 50 according to the present embodiment includes a CPU 501 that controls the entire operation of the management system 50, a ROM 502 that stores a control program for controlling the CPU 501 such as the IPL, a RAM 503 that is used as a work area for the CPU 501, a hard disk (HD) 504 that stores various kinds of data such as a control program for the management system 50, a hard disk drive (HDD) 505 that controls reading or writing of various kinds of data to or from the HD 504 under control of the CPU 501, a medium drive 507 that controls reading or writing of data from and to a recording medium 506 such as a flash memory, a display 508 that displays various kinds of information such as a cursor, a menu, a window, a character, and an image, a network interface (I/F) 509 that performs data communication using the communication network 2, a keyboard 511 that is provided with a plurality of keys for allowing a user to input characters, numerical values, or various kinds of instructions, a mouse 512 for selecting or executing various kinds of instructions, selecting an object to be processed, or for moving a cursor, a compact disc read only memory (CD-ROM) drive 514 that reads or writes various kinds of data from and to a CD-ROM 513, which is one example of removable recording medium, and a bus line 510 such as an address bus or a data bus that electrically connects various elements as above to each other as illustrated in FIG. 3.

Note that the hardware configuration of the authentication server 40 illustrated in FIG. 1 is similar to that of the management system 50, and thus the description of the hardware configuration of the authentication server 40 is omitted.

<Software Configuration of Communication Terminal>

Figure 4:
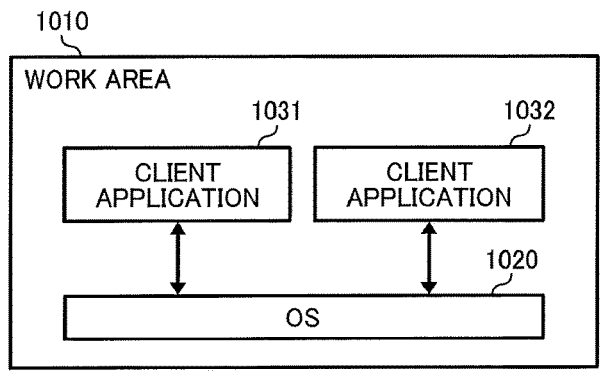
FIG. 4 is a schematic block diagram illustrating a software configuration of a communication terminal according to an embodiment of the present invention.

FIG. 4 is a schematic block diagram illustrating a software configuration of the communication terminal 10 according to the present embodiment.

As illustrated in FIG. 4, the communication terminal 10 is installed with an operating system (OS) 1020 and client applications 1031 and 1032, and these client applications 1031 and 1032 may be deployed on a work area 1010 of the RAM 103. In FIG. 4, the communication terminal 10 is installed with the OS 1020 and the client applications 1031 and 1032.

The OS 1020 is basic software that controls entire operation of the communication terminal 10 through providing basic functions. The client applications 1031 and 1032 request the authentication server 40 to perform authentication, and sends at least one of a pub request and a sub request to the management system 50.

In FIG. 4, the communication terminal 10 is installed with at least two client applications (for example, the client applications 1031 and 1032). However, no limitation is indicated thereby, and the communication terminal 10 may be installed with one or any number of client applications. Alternatively, any desired application may be executed on the OS 1020, and the client applications may operate in such an application.

<Functional Configuration>

Next, the functional configuration according to the present embodiment is described.

Figure 5B:
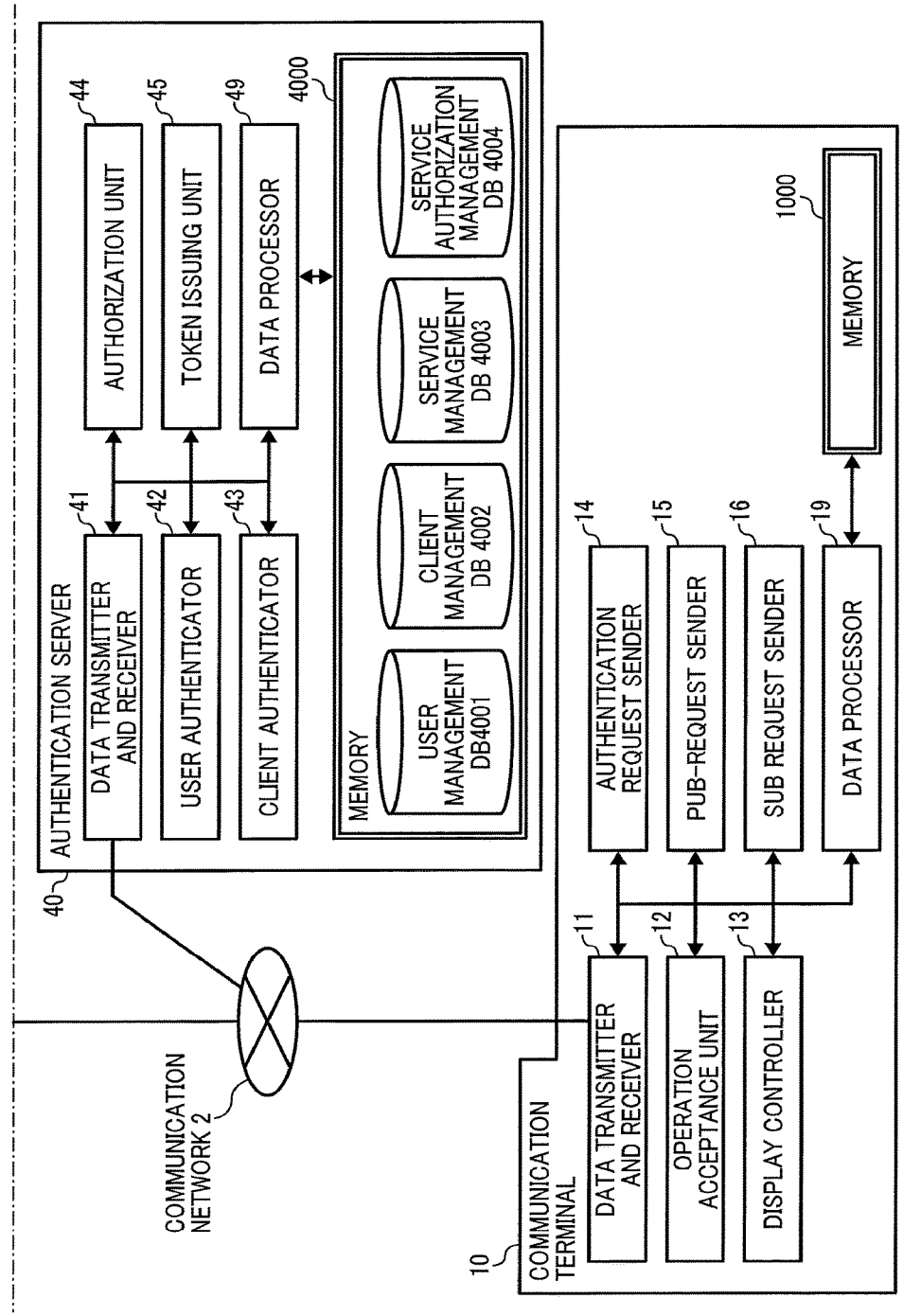

FIG. 5A and FIG. 5B are a functional block diagram of the communication terminal 10, the authentication server 40, and the management system 50, according to an embodiment of the present invention.

Note that the communication terminal 10, the authentication server 40, and the management system 50 together configure a part of the communication system 1. In FIG. 5A and FIG. 5B, the communication terminal 10, the authentication server 40, and the management system 50 are connected with each other so as to perform data communication through the communication network 2.

<Functional Configuration of Communication Terminal>

The communication terminal 10 includes a data transmitter and receiver 11, an operation acceptance unit 12, a display controller 13, an authentication request sender 14, a publication (pub)-request sender 15, a subscription (sub)-request sender 16, and a data processor 19. These elements are functions that are implemented by the operation of some of the hardware components illustrated in FIG. 2 executed by the instructions from the CPU 101 in accordance with a control program expanded from the flash memory 104 onto the RAM 103. The communication terminal 10 further includes a memory 1000 configured by the ROM 102, the RAM 103, and the flash memory 104 illustrated in FIG. 2.

<Detailed Functional Configuration of Communication Terminal>

Next, the functional configuration of the communication terminal 10 is described in detail with reference to FIG. 2, FIG. 5A, and FIG. 5B. In the following description of the functional configuration of the communication terminal 10, the relation of the hardware elements in FIG. 2 with the functional configuration of the communication terminal 10 will also be described.

The data transmitter and receiver 11 is implemented by the instructions from the CPU 101 and the network interface 111, each of which is illustrated in FIG. 2, and transmits or receives various kinds of data (or information) to or from another communication terminal, apparatus, or system, through the communication network 2.

The acceptance unit 12 is implemented by the instructions from the CPU 101, the operation key 108, and the power switch 109, and receives various kinds of input or selection.

The display controller 13 is substantially implemented by the instructions from the CPU 101 illustrated in FIG. 2 and the display interface 117 illustrated in FIG. 2, and sends the image data that is sent from the counterpart terminal to the display 120 during the conversation.

The authentication request sender 14 is implemented by the instructions according to the client applications from the CPU 101 illustrated in FIG. 2, and requests the authentication server 40 to perform authentication. In cases where the communication terminal 10 is installed with a plurality of client applications, the authentication request sender 14 is generated for each one of the executed client applications in the communication terminal 10.

The pub-request sender 15 is implemented by the instructions according to the client applications from the CPU 101 illustrated in FIG. 2, and sends a pub request for a message to the management system 50. When the client application can deal with a sub but cannot deal with a pub, the pub-request sender 15 is not generated in the communication terminal 10. In cases where the communication terminal 10 is installed with a plurality of client applications that can deal with a pub, the pub-request sender 15 is generated for each one of the executed client applications in the communication terminal 10.

The sub-request sender 16 is implemented by the instructions according to the client applications from the CPU 101 illustrated in FIG. 2, and sends a sub request for a message to the management system 50. When the client application can deal with a pub but cannot deal with a sub, the sub-request sender 16 is not generated in the communication terminal 10. In cases where the communication terminal 10 is installed with a plurality of client applications that can deal with a sub, the sub-request sender 16 is generated for each one of the executed client applications in the communication terminal 10.

The data processor 19 is substantially implemented by the instructions from the CPU 101 and the SSD 105, each of which is illustrated in FIG. 2. The data processor 19 stores various types of data in the memory 1000 or read various types of data from the memory 1000. Note that the data processor 19 may be implemented by the instructions from the CPU 101 only.

<Functional Configuration of Authentication Server>

As illustrated in FIG. 5A and FIG. 5B, the authentication server 40 includes a data transmitter and receiver 41, a user authenticator 42, a client authenticator 43, an authorization unit 44, a token issuing unit 45, and a data processor 49. These units are functions implemented by or caused to function by operating some of the elements illustrated in FIG. 3 under the control of the instructions from the CPU 501. Note also that such instructions from the CPU 501 are made in accordance with a program for the authentication server 40 expanded from the HD 504 to the RAM 503. The authentication server 40 also includes a memory 4000 that is configured by the HD 504 illustrated in FIG. 3.

<User Management Table>

FIG. 6A is a diagram illustrating an example data structure of a user management table, according to the present embodiment.

In the memory 4000, as illustrated in FIG. 5A and FIG. 5B, a user management database (DB) 4001 that is made of a user management table is stored. In the authentication management table, for each user ID (identifier, identification), the user name and the password are stored in association with each other.

<Client Management Table>

FIG. 6B is a diagram illustrating an example data structure of a client management table, according to the present embodiment.

In the memory 4000, as illustrated in FIG. 5A and FIG. 5B, a client management database (DB) 4002 that is made of a client management table is stored. In the authentication management table, for each client ID, the client name and the password are stored in association with each other.

<Service Management Table>

FIG. 6C is a diagram illustrating an example data structure of a service management table, according to the present embodiment.

In the memory 4000, as illustrated in FIG. 5A and FIG. 5B, a service management database (DB) 4003 that is made of a service management table is stored. In the service management table, the service name is stored in association with each service ID.

<Service Authorization Management Table>

FIG. 6D is a diagram illustrating an example data structure of a service authorization management table, according to the present embodiment.

In the memory 4000, as illustrated in FIG. 5A and FIG. 5B, a service authorization management database (DB) 4004 that is made of a service authorization management table is stored. In the service authorization management table, the service ID of each service is stored in association with the client ID of the client whose accesses to the service is authorized.

<Detailed Functional Configuration of Authentication Server>

The data transmitter and receiver 41 is implemented by the instructions from the CPU 501 and the network interface 509, each of which is illustrated in FIG. 3, and transmits or receives various kinds of data (or information) to or from another communication terminal, apparatus, or system, through the communication network 2.

The user authenticator 42 is implemented by the instructions from the CPU 501 illustrated in FIG. 3, and performs user authentication in response to a request from a client.

The client authenticator 43 is implemented by the instructions from the CPU 501 illustrated in FIG. 3, and performs client authentication in response to a request from a client.

The authorization unit 44 is implemented by the instructions from the CPU 501 illustrated in FIG. 3, and performs authorization by specifying the access right of a client to service.

The token issuing unit 45 is implemented by the instructions from the CPU 501 illustrated in FIG. 3, and issues an authorizing token to be used in the service that a client wishes to access.

The data processor 49 is substantially implemented by the instructions from the CPU 501 and the HDD 505, each of which is illustrated in FIG. 3. The data processor 49 stores various types of data in the memory 4000 or read various types of data from the memory 4000. Note that the data processor 49 may be implemented by the instructions from the CPU 501 only.

<Functional Configuration of Management System>

The management system 50 includes a data transmitter and receiver 51, a token checker 52, a pub acceptance unit 53, a sub acceptance unit 54, and a data processor 59. These units are functions implemented by or caused to function by operating some of the elements illustrated in FIG. 3 under the control of the instructions from the CPU 501. Note also that such instructions from the CPU 501 are made in accordance with a program for the management system 50 expanded from the HD 504 to the RAM 503. The management system 50 also includes a memory 5000 that is configured by the HD 504 illustrated in FIG. 3.

<Topic Management Table>

FIG. 7A is a diagram depicting a topic management table according to the present embodiment.

In the memory 5000, as illustrated in FIG. 5, a topic management database (DB) 5001 that is made of a topic management table is stored. In the topic management table, topic ID is stored in association with each topic name. A topic is an attribute associated with a message. Once a client application specifies a topic and sends a sub request, the management system 50 sends a message that is published in association with the specified topic to the client application that has sent the sub request on the topic.

<User Topic Management Table>

FIG. 7B is a diagram depicting a user topic management table according to the present embodiment.

In the memory 5000, as illustrated in FIG. 5, a user topic management database (DB) 5002 that is made of a user topic management table is stored. In the user topic management table, the user ID of users, the topic ID of topics, and authorization information are stored in association with each other. The authorization information in FIG. 7B indicates having the authority to authorize a pub request or sub request sent from a user. Note that the authorization information "pub" indicates having the authority to authorize a pub request and the authorization information "sub" indicates having the authority to authorize a sub request. Note also that the authorization information "pubsub" indicates having the authority to authorize a pub request and a sub request.

<User Service Management Table>

FIG. 7C is a diagram illustrating an example data structure of a user service management table, according to the present embodiment.

In the memory 5000, as illustrated in FIG. 5, a user service management database (DB) 5003 that is made of a user service management table is stored. In the user service management table, the user ID of users, the service ID of services, and authorization information are stored in association with each other. The authorization information in FIG. 7C indicates having the authority to authorize a pub request or sub request sent from a user using a service.

<User Client Management Table>

FIG. 7D is a diagram illustrating an example data structure of a user client management table, according to the present embodiment.

In the memory 5000, as illustrated in FIG. 5, a user client management database (DB) 5004 that is made of a user client management table is stored. In the user client management table, the user ID of users, the client ID of clients, and authorization information are stored in association with each other. The authorization information in FIG. 7D indicates having the authority to authorize a pub request or sub request sent by a user using a client.

<Client Topic Management Table>

FIG. 7E is a diagram depicting a client topic management table according to the present embodiment.

In the memory 5000, as illustrated in FIG. 5, a client topic management database (DB) 5005 that is made of a client topic management table is stored. In the client topic management table, the topic ID of topics, the client ID of clients, and authorization information are stored in association with each other. The authorization information in FIG. 7E indicates having the authority to authorize a pub request or sub request sent from a client.

<Client Service Management Table>

FIG. 7F is a diagram depicting a client service management table according to the present embodiment.

In the memory 5000, as illustrated in FIG. 5, a client service management database (DB) 5006 that is made of a client service management table is stored. In the client service management table, the service ID of each service is stored in association with the client ID of the client whose access to the service is authorized.

<Service Topic Management Table>

FIG. 7G is a diagram depicting a service topic management table according to the present embodiment.

In the memory 5000, as illustrated in FIG. 5, a service topic management database (DB) 5007 that is made of a service topic management table is stored. In the service topic management table, the service ID of services, the topic ID of topics, and authorization information are stored in association with each other. The authorization information in FIG. 7G indicates having the authority to authorize a pub request or sub request that is sent using a service.

<Service Inheritance Management Table>

FIG. 7H is a diagram illustrating an example data structure of a service inheritance management table, according to the present embodiment.

In the memory 5000, as illustrated in FIG. 5A and FIG. 5B, a service inheritance management database (DB) 5008 that is made of a service inheritance management table is stored. In the service inheritance management table, the service ID of the services to be inherited and the service ID of the services that inherit the the services to be inherited are stored in association with each other. Among the services associated in the service inheritance management table, the authority to publish or be subscribe to on a certain topic is inherited.

Figure 12A:
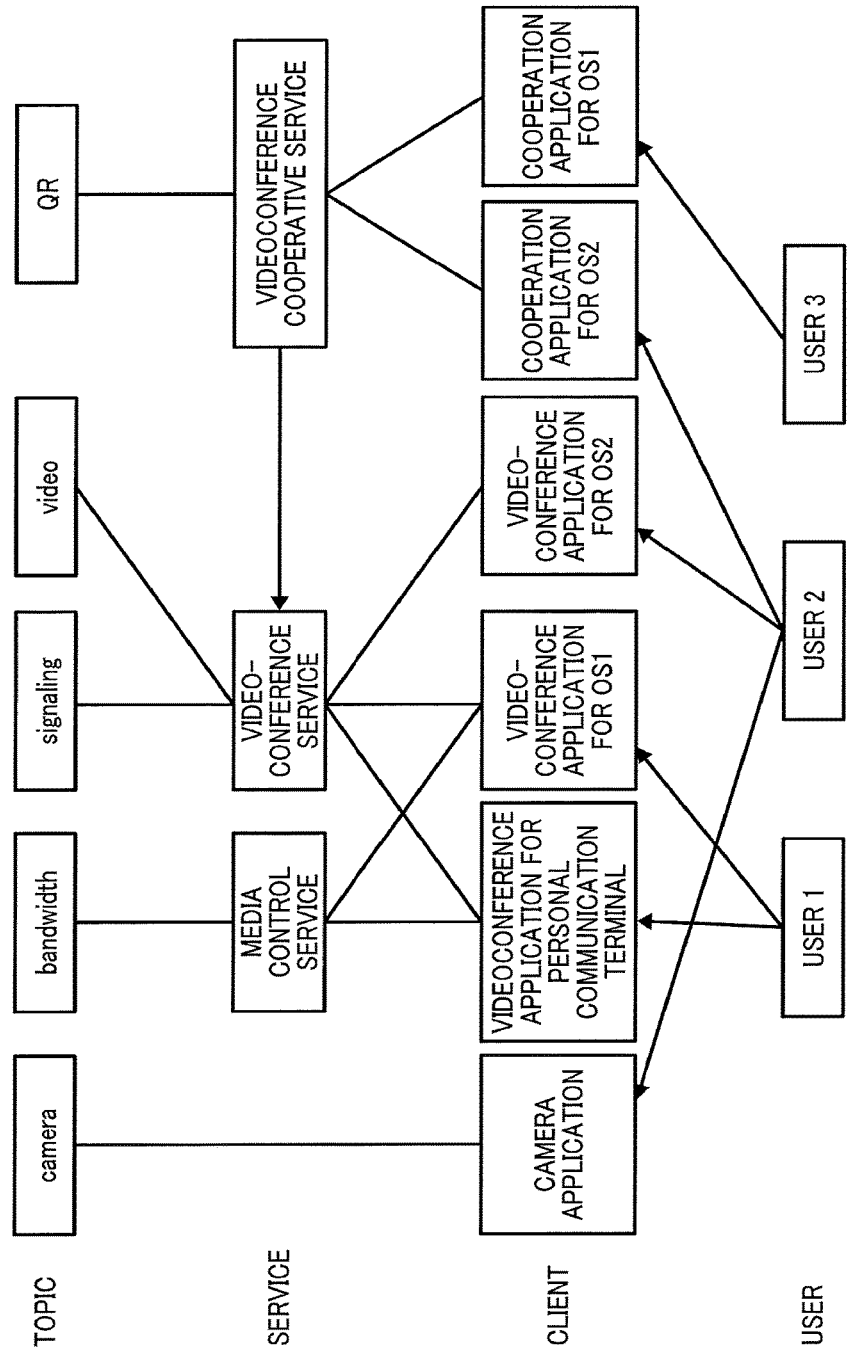
FIG. 12A is a diagram illustrating the authority to publish or subscribe to, according to an embodiment of the present invention.

FIG. 12A is a diagram illustrating the authority to publish or subscribe to, according to the present embodiment.

Each user has the authority to publish or subscribe to a message through the clients that are not associated with that user in the user client management table of FIG. 7D. Each client can use the service or services that are associated in the client service management table of FIG. 7F. Each service has the authority to publish and subscribe to a message on particular topic or topics that are not associated with that service in the service topic management table of FIG. 7G. The authority to publish or subscribe to is inherited among the services that are associated in the service inheritance management table of FIG. 7H. By associating the authority to publish or subscribe to with services as above, not only that a platform does not have to be built for every service, but also that the authority over an already-existing service can be inherited when a new service is to be started.

Figure 12B:
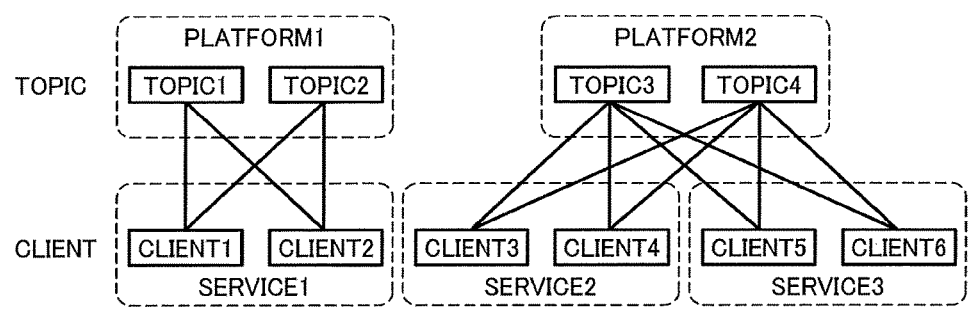
FIG. 12B is a diagram illustrating the authority to publish or subscribe to, according to a control sample.

FIG. 12B is a diagram illustrating the authority to publish or subscribe to, according to a control sample.

In the control sample, the authority to publish or subscribe to is not associated with the services, and the request sender can publish or subscribe to a message on a topic regardless of the service in use. Accordingly, a platform has to be built for every service, or a platform has to be built for each service that deals with the topic in common. Thus, the scalability is poor.

<Session Management Table>

FIG. 7I is a diagram illustrating a session management table according to the present embodiment.

In the memory 5000, as illustrated in FIG. 5A and FIG. 5B, a session management database (DB) 5014 that is made of a session management table is stored. As will be described later, once the login is authenticated by the user ID and the client ID, a session between the communication terminal 10 and the management system 50 is established. Moreover, the communication terminal 10 is authorized to access the service. In the session management table of FIG. 7I, the user ID of the communication terminal 10 that is used to authenticate the login, the client ID, the service ID of the authorized service, and the topic ID of a topic to be subscribed to using the established session are stored in association with each other.

<Detailed Functional Configuration of Management System>

Next, the functional configuration of the management system 50 is described in detail. In the following description of the functional configuration of the management system 50, the relation between the hardware configuration of FIG. 3 and the functional configuration of the management system 50 illustrated in FIG. 5A and FIG. 5B will also be described.

The data transmitter and receiver 51 is implemented by the instructions from the CPU 501 and the network interface 509, each of which is illustrated in FIG. 3, and transmits or receives various kinds of data (or information) to or from another communication terminal, apparatus, or system, through the communication network 2.

The token checker 52 is implemented by the instructions from the CPU 501 illustrated in FIG. 3, and checks an authorizing token included in the login request sent from the communication terminal 10.

The pub acceptance unit 53 is implemented by the instructions from the CPU 501 illustrated in FIG. 3, and receives a pub request from the client.

The sub acceptance unit 54 is implemented by the instructions from the CPU 501 illustrated in FIG. 3, and receives a sub request from the client.

The data processor 59 is substantially implemented by the instructions from the CPU 501 and the HDD 505, each of which is illustrated in FIG. 3. The data processor 59 stores various types of data in the memory 5000 or read various types of data from the memory 5000. Note that the data processor 59 may be implemented by the instructions from the CPU 501 only.

<Operation>

Next, the operation of the communication terminal 10, the authentication server 40, and the management system 50 that together configure the communication system 1 is described. Firstly, the authentication processes according to the present embodiment are described with reference to FIG. 8.

Figure 8:
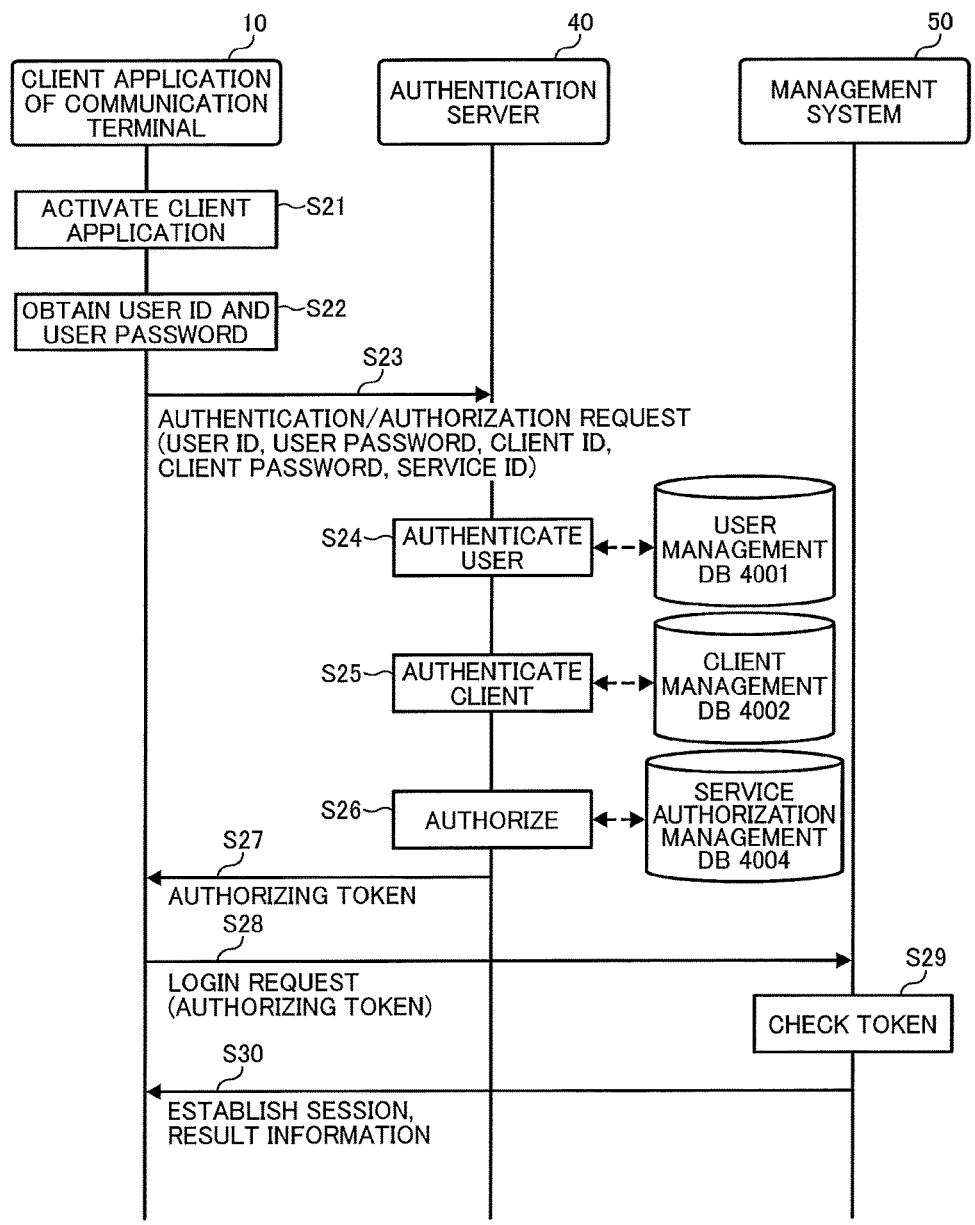
FIG. 8 is a sequence diagram illustrating authentication processes according to an embodiment of the present invention.

FIG. 8 is a sequence diagram illustrating the authentication processes according to the present embodiment.

Once a desired client application that is installed in the communication terminal 10 is activated (step S21), the functional units that correspond to the activated client application start the following processes. The client application of the communication terminal 10 obtains user ID and a user password (step S22). No limitation is intended, but the obtaining method may be, for example, a method in which the operation acceptance unit 12 accepts an input of user ID and a password, and a method in which the data processor 19 reads user ID and a password that are stored in advance in the memory 1000.

The authentication request sender 14 of the communication terminal 10 sends an authentication/authorization request to the authentication server 40 through the data transmitter and receiver 11 (step S23). The authentication/authorization request includes a request to authenticate a user, a request to authenticate a client, and a request to authorize the use of service. The authentication request that is sent to the management system 50 includes the user ID and the user password obtained by the communication terminal 10, client ID and a client password of the activated client application, and service ID that serves as a scope indicating the service to be used. The client ID and the client password may be stored in advance in the memory 1000 and be read by the data processor 19.

The data transmitter and receiver 41 of the authentication server 40 receives an authentication request sent from the communication terminal 10. The user authenticator 42 of the authentication server 40 authenticates a user depending on whether or not a pair of the user ID and the user password included in the authentication request is stored in the user management table (see FIG. 6A) (step S24). When a pair of the user ID and the user password included in the authentication request is stored in the user management table, the user authenticator 42 successfully authenticates the user. When a pair of the user ID and the user password included in the authentication request is not stored in the user management table, the user authenticator 42 fails to authenticate the user.

The client authenticator 43 of the authentication server 40 authenticates a client depending on whether or not a pair of the client ID and the client password included in the authentication request is stored in the client management table (see FIG. 6B) (step S25). When a pair of the client ID and the client password included in the authentication request is stored in the client management table, the client authenticator 43 successfully authenticates the client. When a pair of the client ID and the client password included in the authentication request is not stored in the client management table, the client authenticator 43 fails to authenticate the client.

The authorization unit 44 of the authentication server 40 authorizes a requesting client to access the service depending on whether or not a pair of the client ID and the service ID included in the authentication request is stored in the service authorization management table (see FIG. 6D) (step S26). When a pair of the client ID and the service ID included in the authentication request is stored in the service authorization management table, the authorization unit 44 successfully authorizes the access. When a pair of the client ID and the service ID included in the authentication request is not stored in the service authorization management table, the authorization unit 44 fails to authorize the access.

When there is a failure in at least one of the user authentication, the client authentication, and the service authorization, the data transmitter and receiver 41 sends an error message indicating a failure in authentication or authorization to the request sender communication terminal 10.

When all the user authentication, the client authentication, and the service authorization are successful, the token issuing unit 45 of the authentication server 40 issues an authorizing token that indicates that the request sender communication terminal 10 can access the management system 50 (step S27). The authorizing token includes the user name, the client name, the service name that uses this authorizing token, the expiration date, or the like.

In the communication system 1, authentication and authorization can be performed with a protocol such as the OAuth 2.0 and the OpenID Connect. In such cases, a method of exchanging the authentication information such as user ID and a user password and the contents of the authorizing token are determined by the specification of a protocol such as the OAuth 2.0 and the OpenID Connect. In this configuration, the token may be a JSON Web Token (JWT). In order to ensure that the authorizing token is not tampered in the path, the token issuing unit 45 may digitally sign the authorizing token using a secret key. The secret key may be implemented using the RSA (Rivest, Shamir, and Adleman) cryptosystem. Note also that the digital signature may be implemented using a public key cryptography such as the hash-based message authentication code (HMAC). The management system 50 that uses the authorizing token checks the digital signature using a public key or a secret key depending on whether the authorizing token is digitally signed using a secret key or a public key. The digital signature may be implemented using a known standard, for example, the JSON Web Signature (JWS). The authorizing token may be encoded by using, for example, the JSON Web Encryption (JWE), where appropriate.

The data transmitter and receiver 41 incorporates the issued authorizing token into the authentication result, and sends the authentication result to the communication terminal 10. The data transmitter and receiver 11 of the communication terminal 10 receives from the authentication server the authentication result that includes the authorizing token. Subsequently, the data transmitter and receiver 11 of the communication terminal 10 sends the received authorizing token to the management system 50 to request login (step S28).

The data transmitter and receiver 51 of the management system 50 receives the login request sent from the communication terminal 10. The token checker 52 of the management system 50 checks an authorizing token included in the login request (step S29). In this case, the token checker 52 analyzes the authorizing token that is included in the login request according to the standard adopted in the communication system 1. The token checker 52 may determine whether the digital signature that is made by the authentication server is appropriate based on the result of the analysis. When the digital signature that is made by the authentication server is determined to be inappropriate, the token checker 52 determines that the authorizing token included in the login request has been tampered, and fails to authorize the login request.

Subsequently, the token checker 52 checks the expiration date included in the authorizing token to determine whether or not the expiration date of the authorizing token has expired. When the expiration date of the authorizing token is determined to have expired, the token checker 52 fails to authorize the login request due to the expiration of the authorizing token.

Subsequently, the token checker 52 checks whether or not the authorizing token includes the service name that corresponds to the management system 50. When the authorizing token is determined not to include the service name that corresponds to the management system 50, the token checker 52 fails to authorize the login request.

When the token checker 52 fails to authorize the login request due to the check processes of any one of the digital signature, expiration date, and the service name of the authorizing token, the data transmitter and receiver 51 sends to the communication terminal 10 authorization result information indicating that the authorization ended in failure. When the token checker 52 determines that the digital signature, expiration date, and the service name of the authorizing token are all valid, the use of the service by the user and the client specified in the authorizing token is authorized. Once the user and the client are authorized, the management system 50 establishes a session with the communication terminal 10 (step S30). In such cases, the management system 50 sends to the communication terminal 10 authorization result information indicating that the authorization was successful.

Once the session is established, the management system 50 stores in the memory 1000 the user ID, the client ID, and the service ID, each of which is included in the authorizing token, as well as the IP address of the client or the like, in association with each other. Due to this configuration, the management system 50 can figure out the user ID, the client ID, and the service ID sent from the communication terminal 10 in the authentication/authorization request, without the client's sending the user ID, the client ID, and the service ID to the management system 50 every time the client sends data to the management system 50.

The processes in the steps S21 to S30 as above are performed for each of the client applications activated in the communication terminal 10. For example, each of the client applications such as a camera application and a videoconference application for OS2 may send an authentication request to the authentication server 40. When the management system 50 has successfully authenticated the client applications, a plurality of sessions are simultaneously established between the management system 50 and the client applications, respectively.

Next, the processes in which a message is published and subscribed to among the multiple communication terminals 10 are described with reference to FIG. 9.

Figure 9:
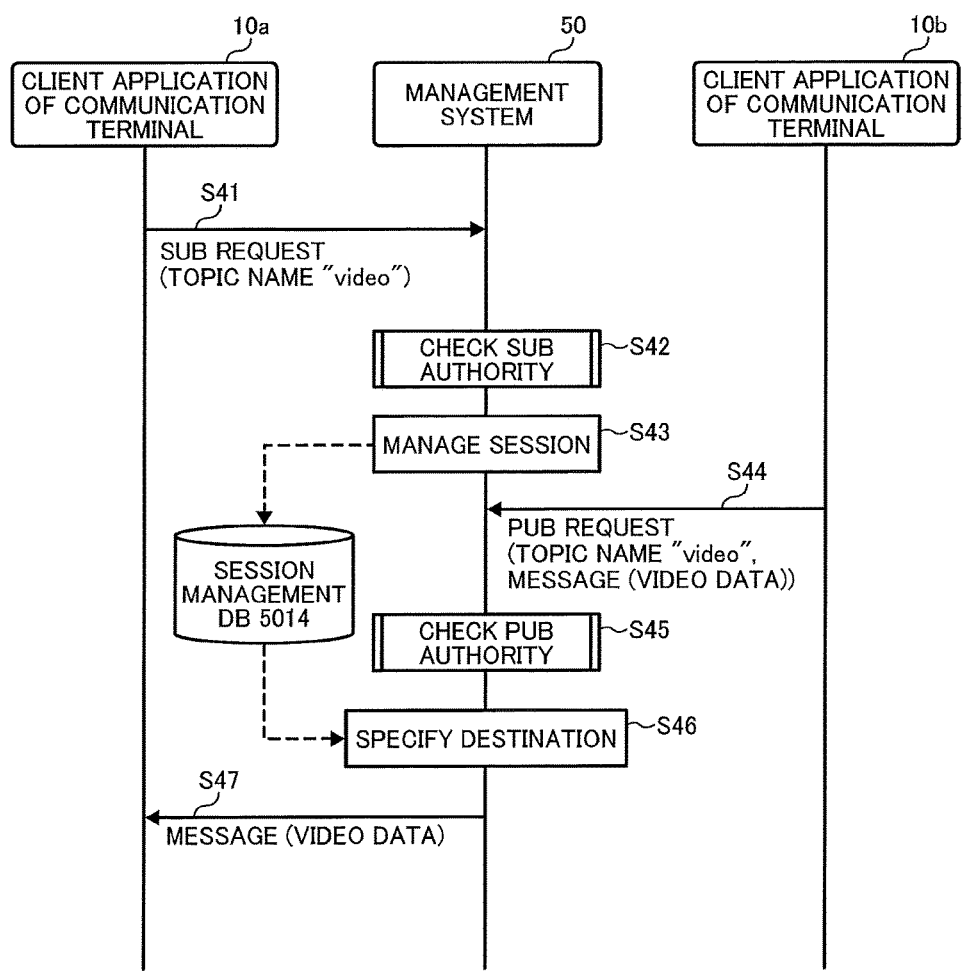
FIG. 9 is a sequence diagram illustrating the processes of publishing and subscribing to a message, according to an embodiment of the present invention.

FIG. 9 is a sequence diagram illustrating the processes of publishing and subscribing to a message, according to the present embodiment.

Hereinafter, the processes in which a message is published and subscribed to between the communication terminal 10a and the communication terminal 10b, which are examples of the multiple communication terminals 10, are described.

Firstly, the processes are described in which the communication terminal 10a that is authenticated by the user ID "U01" of the user "User1" and the client ID "C02" of a client "videoconference application for personal communication terminal" and whose access to a service "videoconference service" is authorized sends a sub request to subscribe to a topic "video". The sub-request sender 16 of the communication terminal 10a sends a sub request to the management system 50 in order to receive a video in the videoconference service (step S41). The sub request includes the topic name "video" related to the video.

Figure 10:
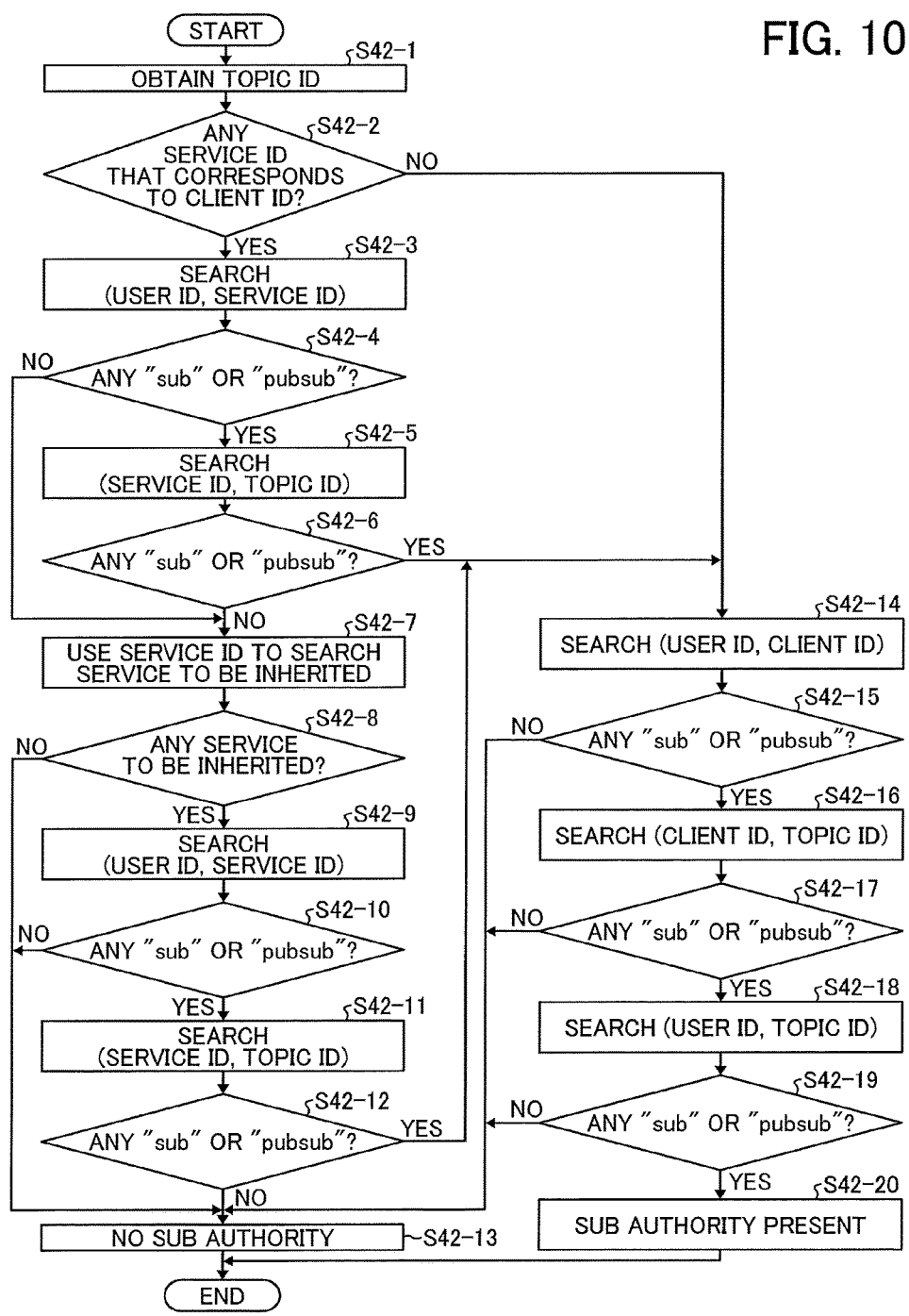
FIG. 10 is a flowchart of the processes of determining whether or not each communication terminal has the authority to subscribe to a message, according to an embodiment of the present invention.

The data transmitter and receiver 51 of the management system 50 receives the sub request sent by the communication terminal 10a. The sub acceptance unit 54 of the management system 50 determines whether or not the videoconference application for personal communication terminal of the communication terminal 10a has the authority to subscribe to a message related to the sub request via the videoconference service (step S42). With reference to FIG. 10, the processes in the step S42 are described in detail.

FIG. 10 is a flowchart of the processes of determining whether or not each communication terminal has the authority to subscribe to a message, according to the present embodiment.

The data processor 59 obtains the topic ID that corresponds to the topic name included in the sub request, from the topic management table (step S42-1). For example, when the topic name included in the sub request is "video", the topic ID "T04" is obtained from the topic management table.

The sub acceptance unit 54 refers to the client service management table and determines whether there is any service ID that is associated with the client ID of the client of the sub-request sender (step S42-2). The client ID of the sub-request sender is included in the authorizing token that is sent to the management system 50 when the communication terminal 10a logged in the management system 50 beforehand. For example, when the client ID of the client "videoconference application for personal communication terminal" of the sub-request sender is "C02", it is determined that there is service ID that is associated with the client ID in the client service management table. When it is determined to be "NO" in the step S42-2, the process proceeds to a step S42-14, and the sub authority is checked according to the relation among the user, client, and the topic of the sub-request sender. Due to the determination made in the step S42-2 as above, the subscribing processes with using a service and the subscribing processes without using a service can be implemented with a common platform.

When it is determined to be "YES" in the step S42-2, the sub acceptance unit 54 starts checking the sub authority according to the relation among the user, client, service to be used, and the topic of the sub-request sender. Firstly, the sub acceptance unit 54 uses the pair of the user ID of the user of the sub-request sender and the service ID of the service authorized by the sub-request sender as a search key to search the user service management table (step S42-3). The user ID of the user of the sub-request sender and the service ID of the service authorized by the sub-request sender are included in the authorizing token that is sent to the management system 50 when the sub-request sender logged in the management system 50 beforehand. For example, when the user ID of the user of the sub-request sender is "U01" and the service ID of the authorized service is "S02" as depicted in FIG. 7C, the authorization information "sub" that corresponds to the above pair of ID is obtained from the user service management table.

The sub acceptance unit 54 determines whether or not any authorization information "sub" or "pubsub" is obtained in the step S42-3 (step S42-4). When it is determined that authorization information "sub" or "pubsub" is not obtained ("NO" in the step S42-4), the process proceeds to a step S42-7, and the service to be inherited is checked.

When it is determined that authorization information "sub" or "pubsub" is obtained ("YES" in the step S42-4), the sub acceptance unit 54 uses the pair of the service ID of the service authorized by the sub-request sender and the topic ID obtained in the step S42-1 as a search key to search the service topic management table (step S42-5). For example, when the service ID of the service that is authorized by the sub-request sender is "S02" and the obtained topic ID is "T04", the authorization information "pubsub" that corresponds to the above pair of ID is obtained.

The sub acceptance unit 54 determines whether or not any authorization information "sub" or "pubsub" is obtained in the step S42-5 (step S42-6). When it is determined that authorization information "sub" or "pubsub" is obtained ("YES" in the step S42-6), the process proceeds to a step S42-14, and the sub authority is checked according to the relation among the user, client, and the topic of the sub-request sender.

When it is determined that authorization information "sub" or "pubsub" is not obtained ("NO" in the step S42-4 or the step S42-6), the sub acceptance unit 54 uses the service ID of the service authorized by the sub-request sender as a search key to search the field of services to be inherited in the service inheritance management table (step S42-7)

The sub acceptance unit 54 determines whether the service ID of any corresponding service to be inherited is obtained in the step S42-7 (step S42-8). When it is determined to be "NO" in the step S42-8, the sub acceptance unit 54 determines that the sub-request sender does not have any sub authority as no service is to be inherited in the sub-request sender (step S42-13). In this case, the data transmitter and receiver 51 sends data indicating the rejection of the sub request to the request sender communication terminal 10a. Then, the process is terminated.

When it is determined to be "YES" in the step S42-8, the checking of the sub authority starts according to the relation among the user, client, service to be inherited, and the topic of the sub-request sender. Firstly, the sub acceptance unit 54 uses the pair of the user ID of the user of the sub-request sender and the service ID of the service to be inherited obtained in the step S42-7 as a search key to search the user service management table (step S42-9).

The sub acceptance unit 54 determines whether or not any authorization information "sub" or "pubsub" is obtained in the step S42-9 (step S42-10) When it is determined that authorization information "sub" or "pubsub" is not obtained ("NO" in the step S42-10), the sub acceptance unit 54 determines that the sub-request sender does not have any sub authority (step S42-13). In this case, the data transmitter and receiver 51 sends data indicating the rejection of the sub request to the request sender communication terminal 10a. Then, the process is terminated.

When it is determined that authorization information "sub" or "pubsub" is obtained ("YES" in the step S42-10), the sub acceptance unit 54 uses the pair of the service ID of the service to be inherited obtained in the step S42-7 and the topic ID obtained in the step S42-1 as a search key to search the service topic management table (step S42-11).

The sub acceptance unit 54 determines whether or not any authorization information "sub" or "pubsub" is obtained in the step S42-11 (step S42-12). When it is determined that authorization information "sub" or "pubsub" is obtained ("YES" in the step S42-12), the process proceeds to a step S42-14, and the sub authority is checked according to the relation among the user, client, and the topic of the sub-request sender.

When it is determined that authorization information "sub" or "pubsub" is not obtained ("NO" in the step S42-12), the sub acceptance unit 54 determines that the sub-request sender does not have any sub authority (step S42-13). In this case, the data transmitter and receiver 51 sends data indicating the rejection of the sub request to the request sender communication terminal 10a. Then, the process is terminated.

When it is determined to be "NO" in the step S42-2, or when it is determined to be "YES" in the step S42-6 and the step S42-12, the sub acceptance unit 54 uses the pair of the user ID of the user of the sub-request sender and the client ID of the client of the sub-request sender as a search key to search the user client management table (step S42-14). For example, when the user ID of the user of the sub-request sender is "U01" and the client ID of the client of the sub-request sender is "C02", the authorization information "sub" that corresponds to the above pair of ID is obtained from the user client management table.

The sub acceptance unit 54 determines whether or not any authorization information "sub" or "pubsub" is obtained in the step S42-14 (step S42-15). When it is determined that authorization information "sub" or "pubsub" is not obtained ("NO" in the step S42-15), the sub acceptance unit 54 determines that the sub-request sender does not have any sub authority (step S42-13). In this case, the data transmitter and receiver 51 sends data indicating the rejection of the sub request to the request sender communication terminal 10a. Then, the process is terminated.

When it is determined that authorization information "sub" or "pubsub" is obtained ("YES" in the step S42-15), the sub acceptance unit 54 uses the pair of the client ID of the client of the sub-request sender and the topic ID of the topic obtained in the step S42-1 as a search key to search the client topic management table (step S42-16). For example, when the client ID of the client of the sub-request sender is "C02" and the obtained topic ID of the topic is "T04", the authorization information "sub" that corresponds to the above pair of ID is obtained from the client topic management table.

The sub acceptance unit 54 determines whether or not any authorization information "sub" or "pubsub" is obtained in the step S42-16 (step S42-17). When it is determined that authorization information "sub" or "pubsub" is not obtained ("NO" in the step S42-17), the sub acceptance unit 54 determines that the sub-request sender does not have any sub authority (step S42-13). In this case, the data transmitter and receiver 51 sends data indicating the rejection of the sub request to the request sender communication terminal 10a. Then, the process is terminated.

When it is determined that authorization information "sub" or "pubsub" is obtained ("YES" in the step S42-17), the sub acceptance unit 54 uses the pair of the user ID of the user of the sub-request sender and the topic ID of the topic obtained in the step S42-1 as a search key to search the user topic management table (step S42-18). For example, when the user ID of the user of the sub-request sender is "U01" and the obtained topic ID of the topic is "T04", the authorization information "sub" that corresponds to the above pair of ID is obtained from the user topic management table.

The sub acceptance unit 54 determines whether or not any authorization information "sub" or "pubsub" is obtained in the step S42-18 (step S42-19). When it is determined that authorization information "sub" or "pubsub" is not obtained ("NO" in the step S42-19), the sub acceptance unit 54 determines that the sub-request sender does not have any sub authority (step S42-13). In this case, the data transmitter and receiver 51 sends data indicating the rejection of the sub request to the request sender communication terminal 10a. Then, the process is terminated.

When it is determined that authorization information "sub" or "pubsub" is obtained ("YES" in the step S42-19), the sub acceptance unit 54 determines that the sub request sender has sub authority (step S42-20).

When it is determined in the step S42-20 that the sub-request sender has sub authority, In this case, the sub acceptance unit 54 registers the user ID of the sub-request sender, the client ID, the service ID of the service authorized by the sub-request sender, and the topic ID of the topic specified by the sub request in association with each other in the session management table of FIG. 7I (step S43).

Subsequently, authentication is performed with the user ID "U02" of the user "User2" and the client ID "C05" of the client "cooperation application for OS2", and the communication terminal 10b whose access to the service "videoconference cooperative service" is authorized sends a pub request on the topic "video". The pub-request sender 15 of the communication terminal 10b sends a pub request to the management system 50 in order to distribute a video in the videoconference service (step S44). The pub request includes the topic name "video" related to the video and the message including the video data captured by the local communication terminal.

Figure 11:
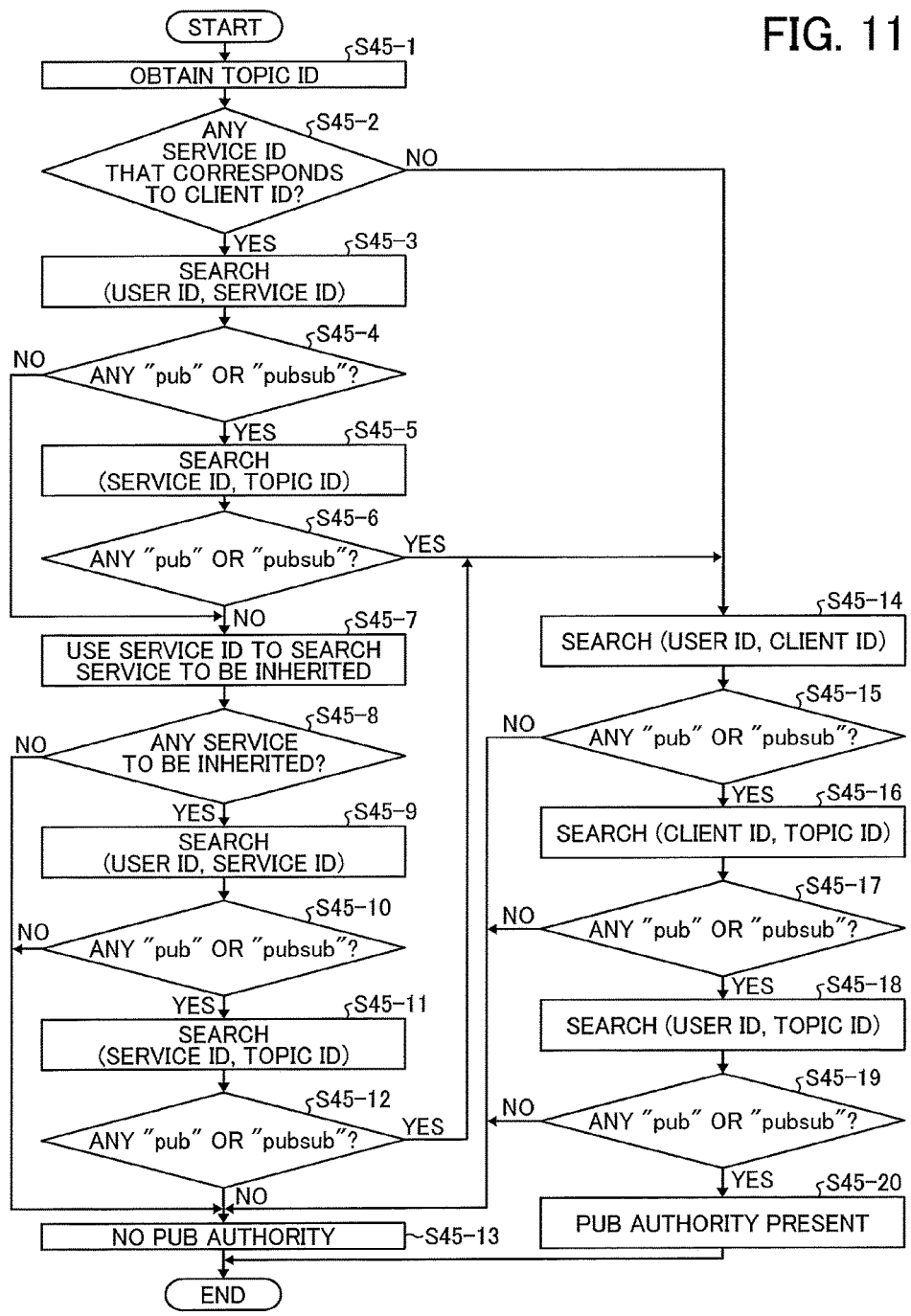
FIG. 11 is a flowchart of the processes of determining whether or not each communication terminal has the authority to publish a message, according to an embodiment of the present invention.

The data transmitter and receiver 51 of the management system 50 receives the pub request sent by the communication terminal 10b. The pub acceptance unit 53 of the management system 50 determines whether or not the cooperation application for OS2 of the communication terminal 10b has the authority to subscribe to a message related to the pub request via the videoconference cooperative service (step S45). With reference to FIG. 11, the processes in the step S45 are described in detail.

FIG. 11 is a flowchart of the processes of determining whether or not each communication terminal has the authority to publish a message, according to the present embodiment.

The data processor 59 obtains the topic ID that corresponds to the topic name included in the pub request, from the topic management table (step S45-1). For example, when the topic name included in the pub request is "video", the topic ID "T04" is obtained from the topic management table.

The pub acceptance unit 53 refers to the client service management table and determines whether there is any service ID that is associated with the client ID of the client of the pub-request sender (step S45-2). The client ID of the pub-request sender is included in the authorizing token that is sent to the management system 50 when the communication terminal 10b logged in the management system 50 beforehand. For example, when the client ID of the client "cooperation application for OS2" of the pub-request sender is "C05", it is determined that there is service ID that is associated with the client ID in the client service management table. When it is determined to be "NO" in the step S45-2, the process proceeds to a step S45-14, and the pub authority is checked according to the relation among the user, client, and the topic of the pub-request sender. Due to the determination made in the step S45-2 as above, the publishing processes with using a service and the publishing processes without using a service can be implemented with a common platform.

When it is determined to be "YES" in the step S45-2, the pub acceptance unit 53 starts checking the pub authority according to the relation among the user, client, service to be used, and the topic of the pub-request sender. Firstly, the pub acceptance unit 53 uses the pair of the user ID of the user of the pub-request sender and the service ID of the service authorized by the pub-request sender as a search key to search the user service management table (step S45-3). The user ID of the user of the pub-request sender and the service ID of the service authorized by the pub-request sender are included in the authorizing token that is sent to the management system 50 when the pub-request sender logged in the management system 50 beforehand. For example, when the user ID of the user of the pub-request sender is "U02" and the service ID of the authorized service is "S03", the authorization information "pubsub" that corresponds to the above pair of ID is obtained from the user service management table.

The pub acceptance unit 53 determines whether or not any authorization information "pub" or "pubsub" is obtained in the step S45-3 (step S45-4). When it is determined that authorization information "pub" or "pubsub" is not obtained ("NO" in the step S45-4), the process proceeds to a step S45-7, and the service to be inherited is checked.

When it is determined that authorization information "pub" or "pubsub" is obtained ("YES" in the step S45-4), the pub acceptance unit 53 uses the pair of the service ID of the service authorized by the pub-request sender and the topic ID obtained in the step S45-1 as a search key to search the service topic management table (step S45-5). For example, when the service ID of the service that is authorized by the pub-request sender is "S03" and the obtained topic ID is "T04" as depicted in FIG. 7G, no authorization information is obtained as there is no authorization information that corresponds to the above pair of ID.

The pub acceptance unit 53 determines whether or not any corresponding authorization information "pub" or "pubsub" is obtained in the step S45-5 (step S45-6). When it is determined that authorization information "pub" or "pubsub" is obtained ("YES" in the step S45-6), the process proceeds to a step S45-14, and the pub authority is checked according to the relation among the user, client, and the topic of the pub-request sender.

When it is determined that authorization information "pub" or "pubsub" is not obtained ("NO" in the step S45-4 or the step S45-6), the pub acceptance unit 53 uses the service ID of the service authorized by the pub-request sender as a search key to search the field of services to be inherited in the service inheritance management table (step S45-7). For example, the service ID "02" of the service is to be inherited which corresponds to the service ID "03" of the service that is authorized by the pub-request sender is obtained.

The pub acceptance unit 53 determines whether the service ID of any corresponding service to be inherited is obtained in the step S45-7 (step S45-8). When it is determined to be "NO" in the step S45-8, the pub acceptance unit 53 determines that the pub-request sender does not have any pub authority as no service is to be inherited in the pub-request sender (step S45-13). In this case, the data transmitter and receiver 51 sends data indicating the rejection of the pub request to the request sender communication terminal 10b. Then, the process is terminated.

When it is determined to be "YES" in the step S45-8, the checking of the pub authority starts according to the relation among the user, client, service to be inherited, and the topic of the pub-request sender. Firstly, the pub acceptance unit 53 uses the pair of the user ID of the user of the pub-request sender and the service ID of the service to be inherited obtained in the step S45-7 as a search key to search the user service management table (step S45-9). For example, when the user ID of the pub-request sender is "U02" and the service ID of the service to be inherited is "S02" as depicted in FIG. 7C, the authorization information "pub" that corresponds to the above pair of ID is obtained from the user service management table.

The pub acceptance unit 53 determines whether or not any authorization information "pub" or "pubsub" is obtained in the step S45-9 (step S45-10). When it is determined that authorization information "pub" or "pubsub" is not obtained ("NO" in the step S45-10), the pub acceptance unit 53 determines that the pub-request sender does not have any pub authority (step S45-13). In this case, the data transmitter and receiver 51 sends data indicating the rejection of the pub request to the request sender communication terminal 10b. Then, the process is terminated.

When it is determined that authorization information "pub" or "pubsub" is obtained ("YES" in the step S45-10), the pub acceptance unit 53 uses the pair of the service ID of the service to be inherited obtained in the step S45-7 and the topic ID obtained in the step S45-1 as a search key to search the service topic management table (step S45-11) For example, when the service ID of the service to be inherited is "S02" and the obtained topic ID is "T04", the authorization information "pubsub" that corresponds to the above pair of ID is obtained from the service topic management table.

The pub acceptance unit 53 determines whether or not any authorization information "pub" or "pubsub" is obtained in the step S45-11 (step S45-12). When it is determined that authorization information "pub" or "pubsub" is obtained ("YES" in the step S45-12), the process proceeds to a step S45-14, and the pub authority is checked according to the relation among the user, client, and the topic of the pub-request sender.

When it is determined that authorization information "pub" or "pubsub" is not obtained ("NO" in the step S45-12), the pub acceptance unit 53 determines that the pub-request sender does not have any pub authority (step S45-13). In this case, the data transmitter and receiver 51 sends data indicating the rejection of the pub request to the request sender communication terminal 10b. Then, the process is terminated.

When it is determined to be "NO" in the step S45-2, or when it is determined to be "YES" in the step S45-6 or the step S45-12, the pub acceptance unit 53 uses the pair of the user ID of the user of the pub-request sender and the client ID of the client of the pub-request sender as a search key to search the user client management table (step S45-14). For example, when the user ID of the user of the pub-request sender is "U02" and the client ID of the client of the pub-request sender is "C05", the authorization information "pub" that corresponds to the above pair of ID is obtained from the user client management table.

The pub acceptance unit 53 determines whether or not any authorization information "pub" or "pubsub" is obtained in the step S45-14 (step S45-15). When it is determined that authorization information "pub" or "pubsub" is not obtained ("NO" in the step S45-15), the pub acceptance unit 53 determines that the pub-request sender does not have any pub authority (step S45-13). In this case, the data transmitter and receiver 51 sends data indicating the rejection of the pub request to the request sender communication terminal 10b. Then, the process is terminated.

When it is determined that authorization information "pub" or "pubsub" is obtained ("YES" in the step S45-15), the pub acceptance unit 53 uses the pair of the client ID of the client of the pub-request sender and the topic ID of the topic obtained in the step S45-1 as a search key to search the client topic management table (step S45-16). For example, when the client ID of the client of the pub-request sender is "C05" and the obtained topic ID of the topic is "T04", the authorization information "pubsub" that corresponds to the above pair of ID is obtained from the client topic management table.

The pub acceptance unit 53 determines whether or not any authorization information "pub" or "pubsub" is obtained in the step S45-16 (step S45-17). When it is determined that authorization information "pub" or "pubsub" is not obtained ("NO" in the step S45-17), the pub acceptance unit 53 determines that the pub-request sender does not have any pub authority (step S45-13). In this case, the data transmitter and receiver 51 sends data indicating the rejection of the pub request to the request sender communication terminal 10b. Then, the process is terminated.

When it is determined that authorization information "pub" or "pubsub" is obtained ("YES" in the step S45-17), the pub acceptance unit 53 uses the pair of the user ID of the user of the pub-request sender and the topic ID of the topic obtained in the step S45-1 as a search key to search the user topic management table (step S45-18). For example, when the user ID of the user of the pub-request sender is "U02" and the obtained topic ID of the topic is "T04", the authorization information "pubsub" that corresponds to the above pair of ID is obtained from the user topic management table.

The pub acceptance unit 53 determines whether or not any authorization information "pub" or "pubsub" is obtained in the step S45-18 (step S45-19). When it is determined that authorization information "pub" or "pubsub" is not obtained ("NO" in the step S45-19), the pub acceptance unit 53 determines that the pub-request sender does not have any pub authority (step S45-13). In this case, the data transmitter and receiver 51 sends data indicating the rejection of the pub request to the request sender communication terminal 10b. Then, the process is terminated.

When it is determined that authorization information "pub" or "pubsub" is obtained ("YES" in the step S45-19), the pub acceptance unit 53 determines that the pub request sender has the pub authority (step S45-20).

When it is determined in the step S45-20 that the pub-request sender has pub authority, the pub acceptance unit 53 uses the topic ID of the topic related to the pub request as a search key to search the session management table, and obtains the corresponding user ID and client ID and the service ID (step S46). For example, when the topic ID of the topic related to the pub request is "T04", the user ID "U01", the client ID "C02", and the service ID "S02" are obtained from the session management table. Accordingly, the pub acceptance unit 53 specifies the communication terminal 10a to be the destination to which the message is to be distributed as the communication terminal 10a has been authenticated with the user ID "U01" and the client ID "C02" the service with the service ID "S02" for the communication terminal 10a has been authorized.

The data transmitter and receiver 51 sends the message related to the pub request, i.e., the video data, to the specified communication terminal 10a. Accordingly, the communication terminal 10a can receive the video data sent from the communication terminal 10b as a message.

The management system 50 may store a message related to the pub request in the memory 5000. By so doing, when a client that is not connected to the management system 50 at the time of pub request is later connected to the management system 50, the management system 50 can send a message stored in the memory 5000 to that client.

Next, some effects of the above example embodiments of the present invention are described. With the communication control method according to the embodiments described above, the data transmitter and receiver 51 of the management system 50 receives a pub request (i.e., an example of a request for distribution) for a message (i.e., an example of information) related to the topic "video" (i.e., an example of a prescribed attribute) from the communication terminal 10b that is authenticated by the cooperation application for OS2 (i.e., an example of the first client). Note that the data transmitter and receiver 51 serves as a receiver, and the communication terminal 10b serves as a first communication terminal. Moreover, the data transmitter and receiver 51 of the management system 50 receives a sub request (i.e., an example of a request for reception) for a message related to the topic "video" from the communication terminal 10a that is authenticated by the videoconference application for personal communication terminal (i.e., an example of the second client). Note that the communication terminal 10a serves as the second communication terminal and the reception that is performed by the data transmitter and receiver 51 as above is an example of the step of receiving.

Note also that the topic indicates an attribute that is predetermined to specify the information to be subscribed to in a publish-subscribe model. Note also that the message is information that can be published or subscribed to in the publish-subscribe model and includes not only texts but also contents of data such as image data, video data, and audio data.

The pub acceptance unit 53 and the sub acceptance unit 54 of the management system 50 controls the distribution of a message on the topic "video" to the communication terminal 10a based on whether the videoconference cooperative service, which is used by the cooperation application for OS2, and the videoconference service, which is used by the videoconference application for personal communication terminal, are each associated with the topic "video". Note that the pub acceptance unit 53 and the sub acceptance unit 54 serve as a distribution controller and the controlling that is performed by the pub acceptance unit 53 and the sub acceptance unit 54 is an example of the step of controlling. Note also that the videoconference cooperative service serves as the first service, and the videoconference service serves as the second service. As will be described later, the videoconference cooperative service is associated with the topic "video" due to the inheritance of the service. With the communication system 1 according to the embodiments described above, the access to a message can be controlled for every service that a client uses.

The data transmitter and receiver 51 of the management system 50 receives a pub request for the message related to the topic "video" from the communication terminal 10a that is authenticated by user ID "U02" (i.e., an example of the first account) and receives a sub request for the message related to the topic "video" from the communication terminal 10a that is authenticated by user ID "U01" (i.e., an example of the second account). Note that an account indicates an authority to use a service or the like, and in the communication system 1, user ID is used as an account. The pub acceptance unit 53 and the sub acceptance unit 54 of the management system 50 controls the distribution of the message on the topic "video" to the communication terminal 10a based on whether the user ID "U02" is associated with the videoconference service and whether the user ID "U01" is associated with the videoconference cooperative service. With the communication system 1 according to the embodiments described above, further, the access to a message can be controlled for every service that a user uses.

When the videoconference cooperative service is registered as a service that inherits the videoconference service (i.e., an example of the third service), the pub acceptance unit 53 and the sub acceptance unit 54 of the management system 50 controls the distribution of the message on the topic "video" to the communication terminal 10a based on whether the topic "video" is associated with the videoconference service. With the communication system 1 according to the embodiments described above, the pub authority or sub authority that is set when a certain service is used can be inherited to a specified service.

The pub acceptance unit 53 and the sub acceptance unit 54 of the management system 50 controls the distribution of the message on the topic "video" to the communication terminal 10a based on whether the user ID "U02" is associated with the videoconference service. With the communication system 1 according to the embodiments described above, further, the access to a message can be controlled for every service that a user uses.

When the topic "video" is associated with the videoconference service and the videoconference cooperative service, the pub acceptance unit 53 and the sub acceptance unit 54 of the management system 50 controls the message on the topic "video" to be distributed to the communication terminal 10a. When the topic "video" is not associated with the videoconference service or the videoconference cooperative service, the pub acceptance unit 53 and the sub acceptance unit 54 of the management system 50 controls the message on the topic "video" not to be distributed to the communication terminal 10a. Accordingly, the management system 50 can distribute a message appropriately according to the service that pub-request sender or the sub-request sender uses.

In the service topic management DB 5007 of the management system 50, the topic ID (i.e., an example of attribute information) of topics and the service ID (i.e., an example of service information) of services are stored in association with each other. Note that the service topic management DB 5007 serves as an attribute manager. The pub acceptance unit 53 and the sub acceptance unit 54 of the management system 50 controls the distribution of the message on a predetermined topic to the sub-request sender based on whether the service ID of the services that the pub-request sender and the sub-request sender uses are associated with the topic ID of the predetermined topic in the service topic management DB 5007. Accordingly, in the communication system 1, the access to a message can be controlled for every service that a client uses.

In the following description, an alternative embodiment of the present invention is described with reference to the drawings.

The configuration of a communication system according to the alternative embodiment is similar to that of the communication system 1 according to the above embodiment, and only the differences between the communication system according to the alternative embodiment and the communication system 1 according to the above embodiment will be described.

<Functional Configuration of Management System>

As illustrated in FIG. 5, the management system 50 according to the alternative embodiment also includes the data transmitter and receiver 51, the token checker 52, the pub acceptance unit 53, the sub acceptance unit 54, and the data processor 59. These units are functions implemented by or caused to function by operating some of the elements illustrated in FIG. 3 under the control of the instructions from the CPU 501. Note also that such instructions from the CPU 501 are made in accordance with a program for the management system 50 expanded from the HD 504 to the RAM 503. The management system 50 according to the alternative embodiment also includes the memory 5000 that is configured by the HD 504 illustrated in FIG. 3.

<Topic Management Table>

FIG. 13A is a diagram depicting a topic management table according to the alternative embodiment.

In the memory 5000, as illustrated in FIG. 5A and FIG. 5B, the topic management database (DB) 5001 that is made of a topic management table is stored. In the topic management table, topic ID is stored in association with each topic name. A topic is an attribute associated with a message. Once a client application specifies a topic and sends a sub request, the management system 50 sends a message that is published in association with the specified topic to the client application that has sent the sub request on the topic.

<User Topic Management Table>

FIG. 13B is a diagram depicting a user topic management table according to the alternative embodiment.

In the memory 5000, as illustrated in FIG. 5A and FIG. 5B, the user topic management database (DB) 5002 that is made of a user topic management table is stored. In the user topic management table, the user ID of users, the topic ID of topics, and authorization information are stored in association with each other. The authorization information in FIG. 13B indicates having the authority to reject a pub request or sub request sent from a user. Note that the authorization information "pub" indicates having the authority to reject a pub request and the authorization information "sub" indicates having the authority to reject a sub request. Note also that the authorization information "pubsub" indicates having the authority to reject a pub request and a sub request.

<User Service Management Table>

FIG. 13C is a diagram illustrating an example data structure of a user service management table, according to the alternative embodiment. In the memory 5000, as illustrated in FIG. 5A and FIG. 5B, the user service management database (DB) 5003 that is made of a user service management table is stored. In the user service management table, the user ID of users, the service ID of services, and authorization information are stored in association with each other. The authorization information in FIG. 13C indicates having the authority to reject a pub request or sub request sent from a user using a service.

<User Client Management Table>

FIG. 13D is a diagram illustrating an example data structure of a user client management table, according to the alternative embodiment.

In the memory 5000, as illustrated in FIG. 5A and FIG. 5B, the user client management database (DB) 5004 that is made of a user client management table is stored. In the user client management table, the user ID of users, the client ID of clients, and authorization information are stored in association with each other. The authorization information in FIG. 13D indicates having the authority to reject a pub request or sub request sent by a user using a client.

<Client Topic Management Table>

FIG. 13E is a diagram depicting a client topic management table according to the alternative embodiment.

In the memory 5000, as illustrated in FIG. 5A and FIG. 5B, the client topic management database (DB) 5005 that is made of a client topic management table is stored. In the client topic management table, the topic ID of topics, the client ID of clients, and authorization information are stored in association with each other. The authorization information in FIG. 13E indicates having the authority to reject a pub request or sub request sent from a client.

<Client Service Management Table>

FIG. 13F is a diagram depicting a client service management table according to the alternative embodiment.

In the memory 5000, as illustrated in FIG. 5A and FIG. 5B, the client service management database (DB) 5006 that is made of a client service management table is stored. In the client service management table, the service ID of each service is stored in association with the client ID of the client whose access to the service is authorized.

<Service Topic Management Table>

FIG. 13G is a diagram depicting a service topic management table according to the alternative embodiment.

In the memory 5000, as illustrated in FIG. 5A and FIG. 5B, the service topic management database (DB) 5007 that is made of a service topic management table is stored. In the service topic management table, the service ID of services, the topic ID of topics, and authorization information are stored in association with each other. The authorization information in FIG. 13G indicates having the authority to reject a pub request or sub request that is sent using a service.

<Service Inheritance Management Table>

FIG. 13H is a diagram illustrating an example data structure of a service inheritance management table, according to the alternative embodiment.

In the memory 5000, as illustrated in FIG. 5A and FIG. 5B, the service inheritance management database (DB) 5008 that is made of a service inheritance management table is stored. In the service inheritance management table, the service ID of the services to be inherited and the service ID of the services to be inherited are stored in association with each other. Among the services associated in the service inheritance management table, the authority to publish or be subscribe to on a certain topic is inherited.

<Session Management Table>

FIG. 13I is a diagram illustrating a session management table according to the alternative embodiment.

In the memory 5000, as illustrated in FIG. 5A and FIG. 5B, the session management database (DB) 5014 that is made of a session management table is stored. As will be described later, once the login is authenticated by the user ID and the client ID, a session between the communication terminal 10 and the management system 50 is established. Moreover, the communication terminal 10 is authorized to access the service. In the session management table of FIG. 13I, the user ID of the communication terminal 10 that is used to authenticate the login, the client ID, the service ID of the authorized service, and the topic ID of a topic to be subscribed to using the established session are stored in association with each other.

<Operation>

Next, the operation of the communication terminal 10, the authentication server 40, and the management system 50 that together configure the communication system 1 according to the alternative embodiment is described.

The operation of the communication system according to the alternative embodiment is similar to that of the communication system 1 according to the above embodiment, and only the differences between the operation of the communication system according to the alternative embodiment and the operation of the communication system 1 according to the above embodiment will be described.

Figure 14:
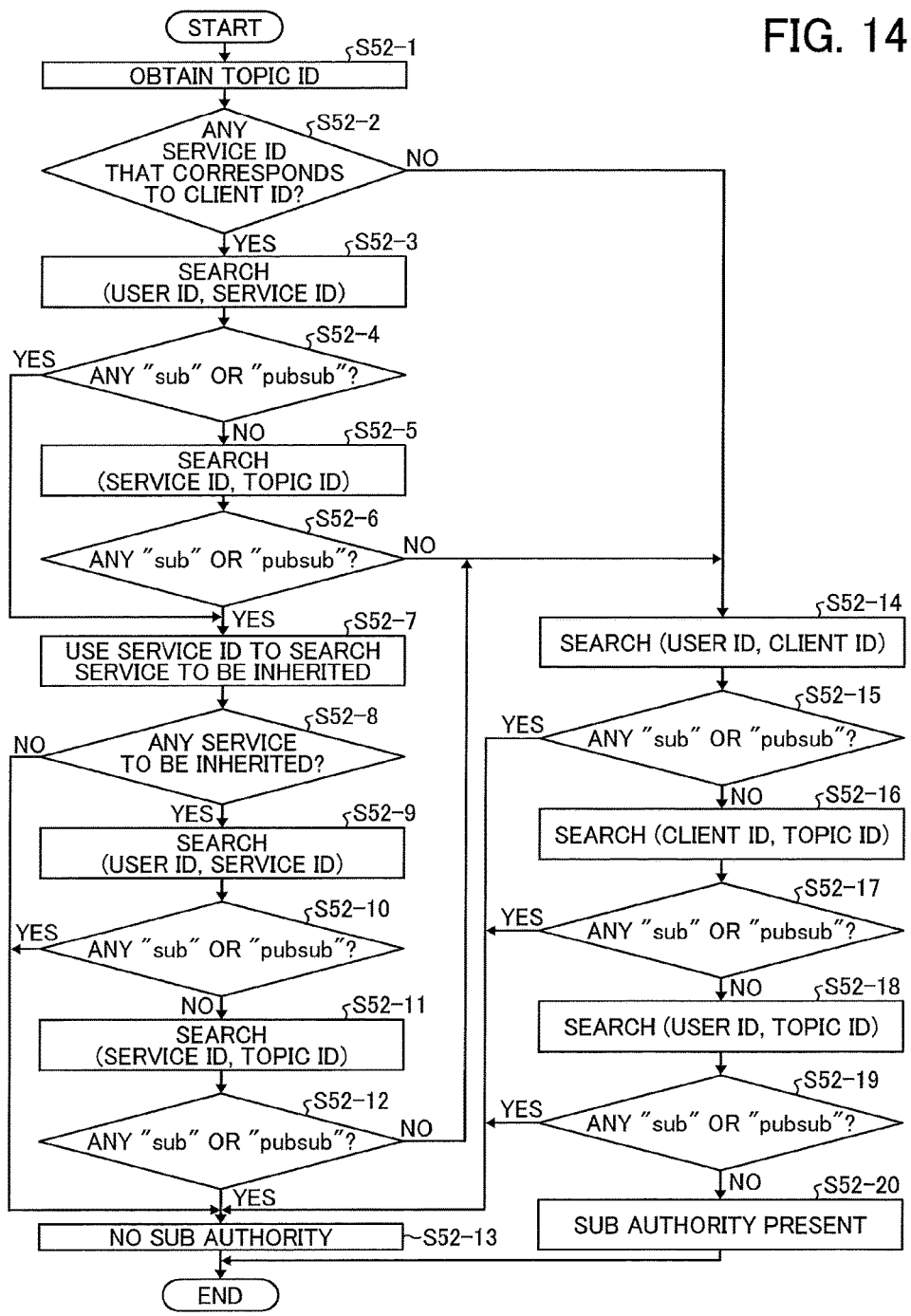
FIG. 14 is a flowchart of the processes of determining whether or not each communication terminal has the authority to subscribe to a message, according to alternative embodiment of the present invention.

FIG. 14 is a flowchart of the processes of determining whether or not each communication terminal has the authority to subscribe to a message, according to the alternative embodiment.

The data processor 59 obtains the topic ID that corresponds to the topic name included in the sub request, from the topic management table (step S52-1). For example, when the topic name included in the sub request is "video", the topic ID "T04" is obtained from the topic management table.

The sub acceptance unit 54 refers to the client service management table and determines whether there is any service ID that is associated with the client ID of the client of the sub-request sender (step S52-2). The client ID of the sub-request sender is included in the authorizing token that is sent to the management system 50 when the communication terminal 10a logged in the management system 50 beforehand. For example, when the client ID of the client "videoconference application for personal communication terminal" of the sub-request sender is "C02", it is determined that there is service ID that is associated with the client ID in the client service management table. When it is determined to be "NO" in the step S52-2, the process proceeds to a step S52-14, and the sub authority is checked according to the relation among the user, client, and the topic of the sub-request sender. Due to the determination made in the step S52-2 as above, the subscribing processes with using a service and the subscribing processes without using a service can be implemented with a common platform.

When it is determined to be "YES" in the step S52-2, the sub acceptance unit 54 starts checking the sub authority according to the relation among the user, client, service to be used, and the topic of the sub-request sender. Firstly, the sub acceptance unit 54 uses the pair of the user ID of the user of the sub-request sender and the service ID of the service authorized by the sub-request sender as a search key to search the user service management table (step S52-3). The user ID of the user of the sub-request sender and the service ID of the service authorized by the sub-request sender are included in the authorizing token that is sent to the management system 50 when the sub-request sender logged in the management system 50 beforehand. For example, when the user ID of the user of the sub-request sender is "U01" and the service ID of the authorized service is "S02" as depicted in FIG. 13C, the authorization information "pub" that corresponds to the above pair of ID is obtained from the user service management table.

The sub acceptance unit 54 determines whether or not any authorization information "sub" or "pubsub" is obtained in the step S52-3 (step S52-4). When it is determined that authorization information "sub" or "pubsub" is obtained ("YES" in the step S52-4), the process proceeds to a step S52-7, and the service to be inherited is checked.

When it is determined that authorization information "sub" or "pubsub" is not obtained ("NO" in the step S52-4), the sub acceptance unit 54 uses the pair of the service ID of the service authorized by the sub-request sender and the topic ID obtained in the step S52-1 as a search key to search the service topic management table (step S52-5). For example, when the service ID of the service that is authorized by the sub-request sender is "S02" and the obtained topic ID is "T04", no authorization information "pubsub" that corresponds to the above pair of ID is obtained.

The sub acceptance unit 54 determines whether or not any authorization information "sub" or "pubsub" is obtained in the step S52-5 (step S52-6). When it is determined that authorization information "sub" or "pubsub" is not obtained ("NO" in the step S52-6), the process proceeds to a step S52-14, and the sub authority is checked according to the relation among the user, client, and the topic of the sub-request sender.

When it is determined that authorization information "sub" or "pubsub" is obtained ("YES" in the step S52-4 and the step S52-6), the sub acceptance unit 54 uses the service ID of the service authorized by the sub-request sender as a search key to search the field of services to be inherited in the service inheritance management table (step S52-7)

The sub acceptance unit 54 determines whether the service ID of any corresponding service to be inherited is obtained in the step S52-7 (step S52-8). When it is determined to be "NO" in the step S52-8, the sub acceptance unit 54 determines that the sub-request sender does not have any sub authority as no service is to be inherited in the sub-request sender (step S52-13). In this case, the data transmitter and receiver 51 sends data indicating the rejection of the sub request to the request sender communication terminal 10a. Then, the process is terminated.

When it is determined to be "YES" in the step S52-8, the checking of the sub authority starts according to the relation among the user, client, service to be inherited, and the topic of the sub-request sender. Firstly, the sub acceptance unit 54 uses the pair of the user ID of the user of the sub-request sender and the service ID of the service to be inherited obtained in the step S52-7 as a search key to search the user service management table (step S52-9).

The sub acceptance unit 54 determines whether or not any authorization information "sub" or "pubsub" is obtained in the step S52-9 (step S52-10). When it is determined that authorization information "sub" or "pubsub" is obtained ("YES" in the step S52-10), the sub acceptance unit 54 determines that the sub-request sender does not have any sub authority (step S52-13). In this case, the data transmitter and receiver 51 sends data indicating the rejection of the sub request to the request sender communication terminal 10a. Then, the process is terminated.

When it is determined that authorization information "sub" or "pubsub" is not obtained ("NO" in the step S52-10), the sub acceptance unit 54 uses the pair of the service ID of the service to be inherited obtained in the step S52-7 and the topic ID obtained in the step S52-1 as a search key to search the service topic management table (step S52-11).

The sub acceptance unit 54 determines whether or not any authorization information "sub" or "pubsub" is obtained in the step S52-11 (step S52-12). When it is determined that authorization information "sub" or "pubsub" is not obtained ("NO" in the step S52-12), the process proceeds to a step S52-14, and the sub authority is checked according to the relation among the user, client, and the topic of the sub-request sender.

When it is determined that authorization information "sub" or "pubsub" is obtained ("YES" in the step S52-12), the sub acceptance unit 54 determines that the sub-request sender does not have any sub authority (step S52-13). In this case, the data transmitter and receiver 51 sends data indicating the rejection of the sub request to the request sender communication terminal 10a. Then, the process is terminated.

When it is determined to be "NO" in the steps S52-2, S52-6, and S52-12, the sub acceptance unit 54 uses the pair of the user ID of the user of the sub-request sender and the client ID of the client of the sub-request sender as a search key to search the user client management table (step S52-14). For example, when the user ID of the user of the sub-request sender is "U01" and the client ID of the client of the sub-request sender is "C02", the authorization information "pub" that corresponds to the above pair of ID is obtained from the user client management table.

The sub acceptance unit 54 determines whether or not any authorization information "sub" or "pubsub" is obtained in the step S52-14 (step S52-15). When it is determined that authorization information "sub" or "pubsub" is obtained ("YES" in the step S52-15), the sub acceptance unit 54 determines that the sub-request sender does not have any sub authority (step S52-13). In this case, the data transmitter and receiver 51 sends data indicating the rejection of the sub request to the request sender communication terminal 10a. Then, the process is terminated.

When it is determined that authorization information "sub" or "pubsub" is not obtained ("NO" in the step S52-15), the sub acceptance unit 54 uses the pair of the client ID of the client of the sub-request sender and the topic ID of the topic obtained in the step S52-1 as a search key to search the client topic management table (step S52-16). For example, when the client ID of the client of the sub-request sender is "C02" and the obtained topic ID of the topic is "T04", the authorization information "pub" that corresponds to the above pair of ID is obtained from the client topic management table.

The sub acceptance unit 54 determines whether or not any authorization information "sub" or "pubsub" is obtained in the step S52-16 (step S52-17). When it is determined that authorization information "sub" or "pubsub" is obtained ("YES" in the step S52-17), the sub acceptance unit 54 determines that the sub-request sender does not have any sub authority (step S52-13). In this case, the data transmitter and receiver 51 sends data indicating the rejection of the sub request to the request sender communication terminal 10a. Then, the process is terminated.

When it is determined that authorization information "sub" or "pubsub" is not obtained ("NO" in the step S52-17), the sub acceptance unit 54 uses the pair of the user ID of the user of the sub-request sender and the topic ID of the topic obtained in the step S52-1 as a search key to search the user topic management table (step S52-18). For example, when the user ID of the user of the sub-request sender is "U01" and the obtained topic ID of the topic is "T04", the authorization information "pub" that corresponds to the above pair of ID is obtained from the user topic management table.

The sub acceptance unit 54 determines whether or not any authorization information "sub" or "pubsub" is obtained in the step S52-18 (step S52-19). When it is determined that authorization information "sub" or "pubsub" is obtained ("YES" in the step S52-19), the sub acceptance unit 54 determines that the sub-request sender does not have any sub authority (step S52-13). In this case, the data transmitter and receiver 51 sends data indicating the rejection of the sub request to the request sender communication terminal 10a. Then, the process is terminated.

When it is determined that authorization information "sub" or "pubsub" is not obtained ("NO" in the step S52-

19), the sub acceptance unit 54 determines that the sub request sender has sub authority (step S52-20).

Figure 15:
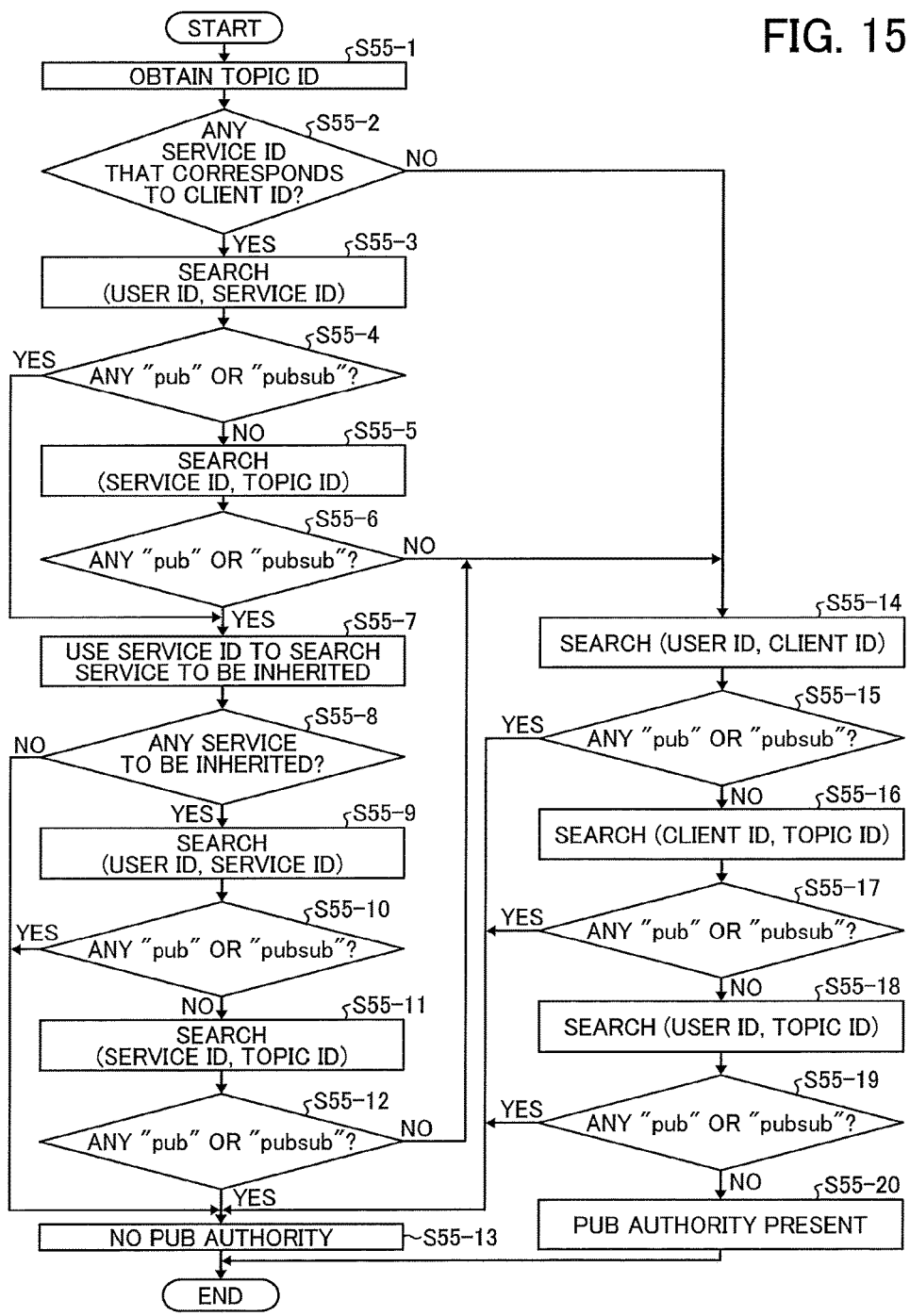
FIG. 15 is a flowchart of the processes of determining whether or not each communication terminal has the authority to publish a message, according to alternative embodiment of the present invention.

FIG. 15 is a flowchart of the processes of determining whether or not each communication terminal has the authority to publish a message, according to the alternative embodiment.

The data processor 59 obtains the topic ID that corresponds to the topic name included in the pub request, from the topic management table (step S55-1). For example, when the topic name included in the pub request is "video", the topic ID "T04" is obtained from the topic management table.

The pub acceptance unit 53 refers to the client service management table and determines whether there is any service ID that is associated with the client ID of the client of the pub-request sender (step S55-2). The client ID of the pub-request sender is included in the authorizing token that is sent to the management system 50 when the communication terminal 10b logged in the management system 50 beforehand. For example, when the client ID of the client "cooperation application for OS2" of the pub-request sender is "C05", it is determined that there is service ID that is associated with the client ID in the client service management table. When it is determined to be "NO" in the step S55-2, the process proceeds to a step S55-14, and the pub authority is checked according to the relation among the user, client, and the topic of the pub-request sender. Due to the determination made in the step S55-2 as above, the publishing processes with using a service and the publishing processes without using a service can be implemented with a common platform.

When it is determined to be "YES" in the step S55-2, the pub acceptance unit 53 starts checking the pub authority according to the relation among the user, client, service to be used, and the topic of the pub-request sender. Firstly, the pub acceptance unit 53 uses the pair of the user ID of the user of the pub-request sender and the service ID of the service authorized by the pub-request sender as a search key to search the user service management table (step S55-3). The user ID of the user of the pub-request sender and the service ID of the service authorized by the pub-request sender are included in the authorizing token that is sent to the management system 50 when the pub-request sender logged in the management system 50 beforehand. For example, when the user ID of the user of the pub-request sender is "U02" and the service ID of the authorized service is "S03", no authorization information is obtained from the user service management table as there is no authorization information that corresponds to the above pair of ID.

The pub acceptance unit 53 determines whether or not any authorization information "pub" or "pubsub" is obtained in the step S55-3 (step S55-4). When it is determined that authorization information "pub" or "pub sub" is obtained ("YES" in the step S55-4), the process proceeds to a step S55-7, and the service to be inherited is checked.

When it is determined that authorization information "pub" or "pubsub" is not obtained ("NO" in the step S55-4), the pub acceptance unit 53 uses the pair of the service ID of the service authorized by the pub-request sender and the topic ID obtained in the step S55-1 as a search key to search the service topic management table (step S55-5). For example, when the service ID of the service that is authorized by the pub-request sender is "S03" and the obtained topic ID is "T04" as depicted in FIG. 13G, the authorization information "pubsub" that corresponds to the above pair of ID is obtained.

The pub acceptance unit 53 determines whether or not any corresponding authorization information "pub" or "pubsub" is obtained in the step S55-5 (step S55-6). When it is determined that authorization information "pub" or "pubsub" is not obtained ("NO" in the step S55-6), the process proceeds to a step S55-14, and the pub authority is checked according to the relation among the user, client, and the topic of the pub-request sender.

When it is determined that authorization information "pub" or "pubsub" is obtained ("YES" in the step S55-4 or the step S55-6), the pub acceptance unit 53 uses the service ID of the service authorized by the pub-request sender as a search key to search the field of services to be inherited in the service inheritance management table (step S55-7). For example, the service ID "02" of the service is to be inherited which corresponds to the service ID "03" of the service that is authorized by the pub-request sender is obtained.

The pub acceptance unit 53 determines whether the service ID of any corresponding service to be inherited is obtained in the step S55-7 (step S55-8). When it is determined to be "NO" in the step S55-8, the pub acceptance unit 53 determines that the pub-request sender does not have any pub authority as no service is to be inherited in the pub-request sender (step S55-13). In this case, the data transmitter and receiver 51 sends data indicating the rejection of the pub request to the request sender communication terminal 10b. Then, the process is terminated.

When it is determined to be "YES" in the step S55-8, the checking of the pub authority starts according to the relation among the user, client, service to be inherited, and the topic of the pub-request sender. Firstly, the pub acceptance unit 53 uses the pair of the user ID of the user of the pub-request sender and the service ID of the service to be inherited obtained in the step S55-7 as a search key to search the user service management table (step S55-9). For example, when the user ID of the pub-request sender is "U02" and the service ID of the service to be inherited is "S02" as depicted in FIG. 13C, the authorization information "sub" that corresponds to the above pair of ID is obtained from the user service management table.

The pub acceptance unit 53 determines whether or not any authorization information "pub" or "pubsub" is obtained in the step S55-9 (step S55-10) When it is determined that authorization information "pub" or "pubsub" is obtained ("YES" in the step S55-10), the pub acceptance unit 53 determines that the pub-request sender does not have any pub authority (step S55-13). In this case, the data transmitter and receiver 51 sends data indicating the rejection of the pub request to the request sender communication terminal 10b. Then, the process is terminated.

When it is determined that authorization information "pub" or "pubsub" is not obtained ("NO" in the step S55-10), the pub acceptance unit 53 uses the pair of the service ID of the service to be inherited obtained in the step S55-7 and the topic ID obtained in the step S55-1 as a search key to search the service topic management table (step S55-11). For example, when the service ID of the service to be inherited is "S02" and the obtained topic ID is "T04", no authorization information is obtained from the service topic management table as there is no authorization information that corresponds to the above pair of ID.

The pub acceptance unit 53 determines whether or not any authorization information "pub" or "pubsub" is obtained in the step S55-11 (step S55-12). When it is determined that authorization information "pub" or "pubsub" is not obtained ("NO" in the step S55-12), the process proceeds to a step S55-14, and the pub authority is checked according to the relation among the user, client, and the topic of the pub-request sender.

When it is determined that authorization information "pub" or "pubsub" is obtained ("YES" in the step S55-12), the pub acceptance unit 53 determines that the pub-request sender does not have any pub authority (step S55-13). In this case, the data transmitter and receiver 51 sends data indicating the rejection of the pub request to the request sender communication terminal 10b. Then, the process is terminated.

When it is determined to be "NO" in the steps S55-2, S55-6, and S55-12, the pub acceptance unit 53 uses the pair of the user ID of the user of the pub-request sender and the client ID of the client of the pub-request sender as a search key to search the user client management table (step S55-14). For example, when the user ID of the user of the pub-request sender is "U02" and the client ID of the client of the pub-request sender is "C05", the authorization information "sub" that corresponds to the above pair of ID is obtained from the user client management table.

The pub acceptance unit 53 determines whether or not any authorization information "pub" or "pubsub" is obtained in the step S55-14 (step S55-15). When it is determined that authorization information "pub" or "pubsub" is obtained ("YES" in the step S55-15), the pub acceptance unit 53 determines that the pub-request sender does not have any pub authority (step S55-13). In this case, the data transmitter and receiver 51 sends data indicating the rejection of the pub request to the request sender communication terminal 10b Then, the process is terminated.

When it is determined that authorization information "pub" or "pub sub" is not obtained ("NO" in the step S55-15), the pub acceptance unit 53 uses the pair of the client ID of the client of the pub-request sender and the topic ID of the topic obtained in the step S55-1 as a search key to search the client topic management table (step S55-16). For example, when the client ID of the client of the pub-request sender is "C05" and the obtained topic ID of the topic is "T04", no authorization information is obtained from the client topic management table as there is no authorization information that corresponds to the above pair of ID.

The pub acceptance unit 53 determines whether or not any authorization information "pub" or "pubsub" is obtained in the step S55-16 (step S55-17). When it is determined that authorization information "pub" or "pubsub" is obtained ("YES" in the step S55-17), the pub acceptance unit 53 determines that the pub-request sender does not have any pub authority (step S55-13). In this case, the data transmitter and receiver 51 sends data indicating the rejection of the pub request to the request sender communication terminal 10b. Then, the process is terminated.

When it is determined that authorization information "pub" or "pubsub" is not obtained ("NO" in the step S55-17), the pub acceptance unit 53 uses the pair of the user ID of the user of the pub-request sender and the topic ID of the topic obtained in the step S55-1 as a search key to search the user topic management table (step S55-18). For example, when the user ID of the user of the pub-request sender is "U02" and the obtained topic ID of the topic is "T04", no authorization information is obtained from the user topic management table as there is no authorization information that corresponds to the above pair of ID.

The pub acceptance unit 53 determines whether or not any authorization information "pub" or "pubsub" is obtained in the step S55-18 (step S55-19). When it is determined that authorization information "pub" or "pubsub" is obtained ("YES" in the step S55-19), the pub acceptance unit 53 determines that the pub-request sender does not have any pub authority (step S55-13). In this case, the data transmitter and receiver 51 sends data indicating the rejection of the pub request to the request sender communication terminal 10b. Then, the process is terminated.

When it is determined that authorization information "pub" or "pubsub" is not obtained ("NO" in the step S55-19), the pub acceptance unit 53 determines that the pub request sender has the pub authority (step S55-20).

Next, some effects of the above example embodiments of the present invention are described. With the communication control method according to the embodiments described above, the data transmitter and receiver 51 of the management system 50 receives a pub request (i.e., an example of a request for distribution) for a message (i.e., an example of information) related to the topic "video" (i.e., an example of a prescribed attribute) from the communication terminal 10b that is authenticated by the cooperation application for OS2 (i.e., an example of the first client). Note that the data transmitter and receiver 51 serves as a receiver, and the communication terminal 10b serves as a first communication terminal. Moreover, the data transmitter and receiver 51 of the management system 50 receives a sub request (i.e., an example of a request for reception) for a message related to the topic "video" from the communication terminal 10a that is authenticated by the videoconference application for personal communication terminal (i.e., an example of the second client). Note that the communication terminal 10a serves as the second communication terminal and the reception that is performed by the data transmitter and receiver 51 as above is an example of the step of receiving.

Note also that the topic indicates an attribute that is predetermined to specify the information to be subscribed to in a publish-subscribe model. Note also that the message is information that can be published or subscribed to in the publish-subscribe model and includes not only texts but also contents of data such as image data, video data, and audio data.

The pub acceptance unit 53 and the sub acceptance unit 54 of the management system 50 controls the distribution of a message on the topic "video" to the communication terminal 10a based on whether the videoconference cooperative service, which is used by the cooperation application for OS2, or the videoconference service, which is used by the videoconference application for personal communication terminal, is associated with the topic "video". Note that the pub acceptance unit 53 and the sub acceptance unit 54 serve as a distribution controller and the controlling that is performed by the pub acceptance unit 53 and the sub acceptance unit 54 is an example of the step of controlling. Note also that the videoconference cooperative service serves as the first service, and the videoconference service serves as the second service. With the communication system 1 according to the embodiments described above, the access to a message can be controlled for every service that a client uses.

The data transmitter and receiver 51 of the management system 50 receives a pub request for the message related to the topic "video" from the communication terminal 10a that is authenticated by user ID "U02" (i.e., an example of the first account) and receives a sub request for the message related to the topic "video" from the communication terminal 10a that is authenticated by user ID "U01" (i.e., an example of the second account). Note that an account indicates an authority to use a service or the like, and in the communication system 1, user ID is used as an account. The pub acceptance unit 53 and the sub acceptance unit 54 of the management system 50 controls the distribution of the message on the topic "video" to the communication terminal 10a based on whether the user ID "U02" is associated with the videoconference service or whether the user ID "U01" is associated with the videoconference cooperative service. With the communication system 1 according to the embodiments described above, further, the access to a message can be controlled for every service that a user uses.

When the videoconference cooperative service is registered as a service that inherits the videoconference service (i.e., an example of the third service), the pub acceptance unit 53 and the sub acceptance unit 54 of the management system 50 controls the distribution of the message on the topic "video" to the communication terminal 10a based on whether the topic "video" is associated with the videoconference service. With the communication system 1 according to the embodiments described above, the pub authority or sub authority that is set when a certain service is used can be inherited to a specified service.

The pub acceptance unit 53 and the sub acceptance unit 54 of the management system 50 controls the distribution of the message on the topic "video" to the communication terminal 10a based on whether the user ID "U02" is associated with the videoconference service. With the communication system 1 according to the embodiments described above, further, the access to a message can be controlled for every service that a user uses.

When the topic "video" is associated with the videoconference service or the videoconference cooperative service, the pub acceptance unit 53 and the sub acceptance unit 54 of the management system 50 controls the message on the topic "video" not to be distributed to the communication terminal 10a. When the topic "video" is not associated with any of the videoconference service and the videoconference cooperative service, the pub acceptance unit 53 and the sub acceptance unit 54 of the management system 50 controls the message on the topic "video" to be distributed to the communication terminal 10a. Accordingly, the management system 50 can distribute a message appropriately according to the service that pub-request sender or the sub-request sender uses.

In the service topic management DB 5007 of the management system 50, the topic ID (i.e., an example of attribute information) of topics and the service ID (i.e., an example of service information) of services are stored in association with each other. Note that the service topic management DB 5007 serves as an attribute manager. The pub acceptance unit 53 and the sub acceptance unit 54 of the management system 50 controls the distribution of the message on a predetermined topic to the sub-request sender based on whether the service ID of the services that the pub-request sender or the sub-request sender uses is associated with the topic ID of the predetermined topic in the service topic management DB 5007. Accordingly, in the communication system 1, the access to a message can be controlled for every service that a client uses.

Further, the control programs for the communication terminal 10, the authentication server 40, and the management system 50 may be recorded in a file in a format installable or executable on a computer-readable recording medium such as the recording medium 106 for distribution. Examples of the recording medium include, but not limited to, a compact disc-recordable (CD-R), a digital versatile disk (DVD), and a Blu-ray disc.

Note also that a recording medium such as a CD-ROM storing the programs according to the example embodiment as described above or the HD 504 storing these programs may be distributed as a program product at home and abroad.

The communication terminal 10, the authentication server 40, and the management system 50 according to the embodiment as described above may be configured by a single computer or a plurality of computers to which functions or units are allocated as desired in a divided manner. Alternatively, the authentication server 40 and the management system 50 may be implemented by a single computer (one or more processors).

A management system comprises: a receiver configured to receive a request to distribute information related to a prescribed attribute from a first communication terminal that is authenticated by a first client and to receive a request to receive a message related to the prescribed attribute from a second communication terminal that is authenticated by a second client; and a distribution controller configured to control distribution of the information related to the prescribed attribute to the second communication terminal based on whether a first service that is used by the first client or a second service that is used by the second client is associated with the prescribed attribute.

In the management system, the receiver receives the request to distribute the information related to the prescribed attribute from the first communication terminal that is authenticated by a first account and receives the request to distribute the information related to the prescribed attribute from the second communication terminal that is authenticated by a second account, and the distribution controller controls the distribution of the information related to the prescribed attribute to the second communication terminal based on whether the first account is associated with the first service or whether the second account is associated with the second service.

In the management system, when the first service is associated with a third service, the distribution controller controls the distribution of the information related to the prescribed attribute to the second communication terminal based on whether the prescribed attribute is associated with the third service.

In the management system, the distribution controller controls the distribution of the information related to the prescribed attribute to the second communication terminal based on whether the first account is associated with the third service.

In the management system, when the first service or the second service is associated with the prescribed attribute, the distribution controller controls the information related to the prescribed attribute not to be distributed to the second communication terminal, and when neither the first service nor the second service is associated with the prescribed attribute, the distribution controller controls the information related to the prescribed attribute to be distributed to the second communication terminal.

The management system further comprises an attribute manager configured to store attribute information indicating an attribute and service information indicating the first service and the second service in association with each other, where the distribution controller controls the distribution of the information related to the prescribed attribute to the second communication terminal based on whether each of the service information of the first service and the service information of the second service is associated with the attribute information of the prescribed attribute in the attribute manager.

A communication system comprises: the management system; the first communication terminal; and the second communication terminal.

A method of controlling communication comprises: receiving a request to distribute information related to a prescribed attribute from a first communication terminal that is authenticated by a first client and to receive a request to receive a message related to the prescribed attribute from a second communication terminal that is authenticated by a second client; and controlling distribution of the information related to the prescribed attribute to the second communication terminal based on whether a first service that is used by the first client or a second service that is used by the second client is associated with the prescribed attribute.

The method further comprises: sending the request to distribute the information related to the prescribed attribute to a management system when the first communication terminal is authenticated by the first client; and sending the request to receive the information related to the prescribed attribute to the management system when the first communication terminal is authenticated by the second client.

A computer-readable non-transitory recording medium stores a program for causing a computer to execute a method, and the method comprises: receiving a request to distribute information related to a prescribed attribute from a first communication terminal that is authenticated by a first client and to receive a request to receive a message related to the prescribed attribute from a second communication terminal that is authenticated by a second client; and controlling distribution of the information related to the prescribed attribute to the second communication terminal based on whether a first service that is used by the first client or a second service that is used by the second client is associated with the prescribed attribute.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. A management system, comprising:
a receiver configured to receive a pubrequest to request distribution of information including a specific topic name from a first communication terminal that is authenticated by a first client and whose access to a first service is authorized, and receive a subrequest to receive a message including the specific topic name from a second communication terminal that is authenticated by a second client and whose access to a second service is authorized; and
processing circuitry configured to control distribution of the information including the specific topic name to the second communication terminal based on whether the first service that is used by the first client and the second service that is used by the second client are each associated with the specific topic name,
wherein the processing circuitry is further configured to determine whether authority to publish or subscribe is obtained for the first service on the specific topic name, and
when it is determined that authority to publish or subscribe is not obtained, the processing circuitry is further configured to obtain a service to be inherited, which is associated with the first service that the first client is authorized to use, determine whether authority to publish or subscribe is obtained for the service to be inherited on the specific topic name, and determine that the first communication terminal has the authority to publish, when it is determined that authority to publish or subscribe is obtained either for the first service or the service to be inherited; and
an attribute manager configured to store attribute information indicating an attribute and service information indicating the first service and the second service are in association with each other,
wherein the processing circuitry is further configured to control the distribution of the information including the specific topic name to the second communication terminal based on whether each of the service information of the first service and the service information of the second service is associated with the attribute information of the specific topic name in the attribute manager.

2. The management system of claim 1, wherein
the processing circuitry is further configured to determine whether authority to publish or subscribe is obtained for the second service on the specific topic name, and
when it is determined that authority to publish or subscribe is not obtained, the processing circuitry is further configured to obtain a service to be inherited, which is associated with the second service that the second client is authorized to use, determine whether authority to publish or subscribe is obtained for the service to be inherited on the specified topic name, and determine that the second communication terminal has the authority to subscribe, when it is determined that authority to publish or subscribe is obtained either for the second service or the service to be inherited.

3. The management system according to claim 2, wherein
the first communication terminal is authenticated by a first account,
the second communication terminal is authenticated by a second account, and
the processing circuitry is further configured to control the distribution of the information including the specific topic name to the second communication terminal based on whether the first account is associated with the first service and whether the second account is associated with the second service.

4. The management system according to claim 2, wherein
the management system further comprises a service inheritance management table configured to store service identifiers of the services to be inherited, and
the processing circuitry is further configured to identify the service to be inherited associated with the first service or the second service, using the service identifiers stored in the service inheritance management table.

5. The management system according to claim 4, wherein
when the first service or the second service is not associated with the specific topic name, the processing circuitry is further configured to control the information including the specific topic name not to be distributed to the second communication terminal.

6. A method of controlling communication, comprising:
receiving a pubrequest to request distribution of information including a specific topic name from a first communication terminal that is authenticated by a first client and whose access to a first service is authorized;
receiving a subrequest to receive a message including the specific topic name from a second communication terminal that is authenticated by a second client and whose access to a second service is authorized; and controlling distribution of the information including the specific topic name to the second communication terminal based on whether the first service that is used by the first client and the second service that is used by the second client are each associated with the specific topic name, wherein determining whether authority to publish or subscribe is obtained for the first service on the specific topic name, when it is determined that authority to publish or subscribe is not obtained, further obtaining a service to be inherited, which is associated with the first service that the first client is authorized to use;

determining whether authority to publish or subscribe is obtained for the service to be inherited on the specific topic name; and determining that the first communication terminal has the authority to publish, when it is determined that authority to publish or subscribe is obtained either for the first service or the service to be inherited; and storing, via an attribute manager, attribute information indicating an attribute and service information indicating the first service and the second service are in association with each other, wherein controlling the distribution of the information including the specific topic name to the second communication terminal is based on whether each of the service information of the first service and the service information of the second service is associated with the attribute information of the specific topic name in the attribute manager.

7. The method according to claim 6, further comprising:

determining whether authority to publish or subscribe is obtained for the second service on the specific topic name, wherein, when it is determined that authority to publish or subscribe is not obtained, the method further comprises obtaining a service to be inherited, which is associated with the second service that the second client is authorized to use; and determining whether authority to publish or subscribe is obtained for the service to be inherited on the specified topic name, and wherein, when it is determined that authority to publish or subscribe is obtained either for the second service or the service to be inherited, the method further comprises determining that the second communication terminal has the authority to subscribe.

8. A communication system, comprising:

a first communication terminal executing a first application and whose access to a first service is authorized;

a second communication terminal executing a second application and whose access to a second service is authorized; and a management system to communicate with the first communication terminal and the second communication terminal through a network using a publish-subscribe pattern, the management system including a receiver configured to receive a pubrequest to request distribution of information including a specific topic name from the first application and to receive a subrequest to receive a message including the specific topic name from the second application, and processing circuitry configured to distribute the information including the specific topic name to the second application when the first service that is used by the first application and the second service that is used by the second application are each associated with the specific topic name, wherein the processing circuitry is further configured to determine whether authority to publish or subscribe is obtained for the first service on the specific topic name, and when it is determined that authority to publish or subscribe is not obtained, the processing circuitry is further configured to obtain a service to be inherited, which is associated with the first service that the first client is authorized to use, determine whether authority to publish or subscribe is obtained for the service to be inherited on the specific topic name, and determine that the first communication terminal has the authority to publish, when it is determined that authority to publish or subscribe is obtained either for the first service or the service to be inherited; and an attribute manager configured to store attribute information indicating an attribute and service information indicating the first service and the second service are in association with each other, wherein the processing circuitry is further configured to control the distribution of the information including the specific topic name to the second communication terminal based on whether each of the service information of the first service and the service information of the second service is associated with the attribute information of the specific topic name in the attribute manager.

9. The communication system according to claim 8, wherein the specific topic name is video, and the information including the specific topic name is video data.

* * * * *